US 6,683,887 B1

(12) United States Patent
Huang et al.

(10) Patent No.: US 6,683,887 B1
(45) Date of Patent: Jan. 27, 2004

(54) ASYMMETRICAL DIGITAL SUBSCRIBER LINE (ADSL) DOWNSTREAM HIGH SPEED CELL BUS INTERFACE PROTOCOL

(75) Inventors: Tony Huang, Santa Clara, CA (US); Prakash Appanna, Fremont, CA (US); Jensheng Lee, Petaluma, CA (US); Hamid Baradaran, Novato, CA (US); Hans Christian Mogensen, Petaluma, CA (US); James Lotz, Napa, CA (US); Tom Kwang-Tsai Koai, Fremont, CA (US); Osama Bahgat, Petaluma, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/465,352

(22) Filed: Dec. 16, 1999

Related U.S. Application Data
(60) Provisional application No. 60/149,742, filed on Aug. 19, 1999.

(51) Int. Cl.[7] .................................................. H04J 3/16
(52) U.S. Cl. ...................... 370/466; 370/487; 370/490; 370/506; 370/510; 370/518
(58) Field of Search ................................ 370/351–354, 370/465–498, 389, 395, 390, 501–518

(56) References Cited

U.S. PATENT DOCUMENTS

| | | | | |
|---|---|---|---|---|
| 5,825,768 A | * | 10/1998 | Kimbrow et al. | 370/341 |
| 5,903,567 A | * | 5/1999 | Alger-Meunier | 370/468 |
| 5,995,568 A | * | 11/1999 | Molnar et al. | 375/354 |
| 6,065,060 A | * | 5/2000 | Liu et al. | 709/233 |
| 6,314,102 B1 | * | 11/2001 | Czerwiec et al. | 370/395.6 |
| 6,334,219 B1 | * | 12/2001 | Hill et al. | 725/106 |
| 6,389,013 B1 | * | 5/2002 | Doss et al. | 370/364 |
| 6,418,558 B1 | * | 7/2002 | Roberts et al. | 725/129 |
| 6,452,944 B1 | * | 9/2002 | Appanna et al. | 370/471 |
| 6,466,586 B1 | * | 10/2002 | Darveau et al. | 370/468 |
| 6,493,348 B1 | * | 12/2002 | Gelman et al. | 370/401 |
| 6,498,808 B1 | * | 12/2002 | Tzannes | 375/225 |
| 6,501,766 B1 | * | 12/2002 | Chaar et al. | 370/458 |
| 6,515,995 B1 | * | 2/2003 | Kim | 370/395.6 |
| 6,546,016 B1 | * | 4/2003 | Gerszberg et al. | 370/401 |
| 6,567,473 B1 | * | 5/2003 | Tzannes | 375/260 |
| 6,608,844 B1 | * | 8/2003 | Teodorescu et al. | 370/512 |

FOREIGN PATENT DOCUMENTS

| KR | 2001055540 A | * | 7/2001 | H04L/12/00 |
|---|---|---|---|---|
| KR | 2002000339 A | * | 1/2002 | H04L/7/04 |

* cited by examiner

*Primary Examiner*—Douglas Olms
*Assistant Examiner*—Van Nguyen
(74) *Attorney, Agent, or Firm*—Richard A. Mysliwiec; V. Lawrence Sewell

(57) ABSTRACT

An asymmetrical digital subscriber line (ADSL) downstream high speed cell bus interface protocol allows ADSL cell packets to be transmitted downstream from an ADSL bank control unit (ABCU) to a plurality of ADSL line units at a high rate of downstream throughput with flexible and efficient allocation of bandwidths and reduced error probability. The frame boundaries of an ADSL frame are derived from a conventional subscriber bus interface (SBI) frame for carrying conventional narrowband plain old telephone service (POTS) traffic, thereby allowing the ABCU and the ADSL line units to be implemented in existing channel banks with standard channel bank backplane traces.

209 Claims, 4 Drawing Sheets

ASYMMETRICAL DIGITAL SUBSCRIBER LINE (ADSL) DOWNSTREAM HIGH SPEED CELL BUS INTERFACE PROTOCOL

CROSS-REFERENCE TO PROVISIONAL APPLICATION

This Patent Application claims the benefit of Provisional Application No. 60/149,742, filed Aug. 19, 1999.

BACKGROUND OF THE INVENTION

1. Field of the Invention

The present invention relates to a system and a protocol for digital communications, and more particularly, to a system and a protocol for asymmetrical digital subscriber line (ADSL) interfaces.

2. Background

The telecommunications industry has developed schemes for transmitting telephony signals in digital formats, for example, in the form of time division multiplexed (TDM) signals for transmission over a physical layer interface, such as a conventional subscriber bus interface (SBI). Transmission over a conventional SBI is typically achieved by using an industry-standard framed format in which digital communications payload data are assigned to a plurality of SBI frames each having a duration of 125 μs. Each of the SBI frames is divided into 32 SBI time slots for carrying communications payload data in a conventional type of digitized telephone service. An example of a conventional telephone service is a plain old telephone service (POTS), which uses an industry-standard digital format known to a person skilled in the art.

A large number of conventional channel banks have been deployed to support conventional narrowband telephony traffic such as POTS traffic. In a conventional channel bank for supporting narrowband POTS traffic, a conventional narrowband channel bank control unit (BCU) is connected to a plurality of conventional POTS line cards to transfer digitized telephony signals in a conventional industry-standard SBI frame format, wherein each of the SBI frames consists of 32 SBI time slots each having a duration of 3.90625 μs.

In a typical channel bank configuration, a conventional standard channel bank backplane is provided with a plurality of metallic backplane traces which are connected between the conventional BCU and he conventional POTS line cards for the transmission of narrowband POTS traffic. The channel bank backplane is typically installed on the back of a standard equipment rack which is capable of accepting the conventional BCU and the conventional POTS line cards. A plurality of standard line card slots are provided on a typical channel bank backplane to accept the conventional POTS line cards. The capacity of the channel bank can be flexibly increased or decreased by plugging conventional POTS line cards into or out of the line card slots on the channel bank backplane.

It is desirable that high speed broadband data communications traffic be supported in existing channel banks which are already widely deployed. More specifically, it is desirable that asymmetrical digital subscriber line (ADSL) traffic be supported on existing channel bank backplanes to take advantage of the large number of channel banks already deployed. Furthermore, it is desirable that a new high speed downstream cell bus interface protocol and system be provided for ADSL traffic with increased speed, efficiency and data integrity while taking advantage of existing channel banks already deployed in conventional telephone switching networks.

SUMMARY OF THE INVENTION

The present invention provides an asymmetrical digital subscriber line (ADSL) downstream high speed cell bus interface protocol and a system for the downstream transmission of ADSL traffic with improved speed, efficiency and data integrity. In accordance with the present invention, a method of data transmission roughly comprises the steps of:

(a) synchronizing frame boundaries of an asymmetrical digital subscriber line (ADSL) frame by using a subscriber bus interface (SBI) frame consisting of a predetermined number of SBI time slots;

(b) assigning a plurality of cell packets to the ADSL frame, the number of cell packets in the ADSL frame different from the number of SBI time slots in the SBI frame; and (c) providing an internal cell for transmission within one of the cell packets, the internal cell comprising a plurality of routing tag bytes and a plurality of payload bytes.

In an embodiment, the internal cell further comprises a plurality of header bytes. In an embodiment, the internal cell in each of the cell packets is encoded to generate an encoded internal cell. In a further embodiment, convolutional forward error correction (FEC) encoding is applied to the internal cell to generate the encoded internal cell. The encoded internal cell is assigned to one of the cell packets in the ADSL frame for downstream transmission.

In an embodiment, the cell packets in an ADSL frame are transmitted downstream from an ADSL bank control unit (ABCU) to a plurality of ADSL line units. In a further embodiment, the routing tag bytes in each of the cell packets comprise a first routing tag byte and a second routing tag byte. In an embodiment, the first routing tag byte comprises a plurality of card slot bits to designate a card slot number for a selected one of the ADSL line units to which the cell packet is to be transmitted.

In an embodiment, each of the ADSL line units has a plurality of destination ports to which the cell packet is capable of being transmitted downstream. In a further embodiment, the second routing tag byte comprises a plurality of cell type indicator bits to indicate to the selected ADSL line unit at least one of the destination ports to which the cell packet is to be transmitted further downstream.

In an embodiment, the ABCU is connected to the ADSL line units through a plurality of data buses each comprising a plurality of data lines and a clock line. In a further embodiment, the first routing tag byte further comprises a version indicator bit capable of indicating whether only one cell packet is transmitted from the ABCU to the ADSL line units through all of the data buses at a time or different cell packets are transmitted simultaneously from the ABCU to the ADSL line units through different data buses, respectively. In another embodiment, the version indicator bit is capable of indicating the format in which the routing tag bytes are implemented.

In an embodiment, the first routing tag byte further comprises a reserved bit temporally preceding the card slot bits. In a further embodiment, the version indicator bit temporally precedes the reserved bit in the first routing tag byte.

In an embodiment, the cell type indicator bits are capable of indicating one of the destination ports as a unicast destination selected for the downstream transmission of the cell packet from the ADSL line unit. In a further embodiment, the cell packet is transmitted to the selected unicast destination via a respective downstream queue based upon the cell type indicator bits.

In a further embodiment, the cell type indicator bits are further capable of indicating one of a plurality of multicast groups selected for the downstream transmission of the cell packet from the ADSL line unit, each of the multicast groups consisting of more than one of the destination ports. In yet a further embodiment, the cell packet is transmitted to the destination ports in the selected multicast group via a plurality of respective downstream queues based upon the cell type indicator bits.

In a further embodiment, the cell type indicator bits are further capable of carrying an idle cell indicator to signify to the selected ADSL line unit that the cell packet is to be discarded. In a further embodiment, the cell type indicator bits are further capable of carrying a central processing unit (CPU) cell indicator to signify to the selected ADSL line unit that the cell packet is to be transmitted via a cell bus data link(CBDL) downstream queue.

In a further embodiment, the cell type indicator bits are further capable of carrying a loop back cell indicator to signify to the selected ADSL line unit that the cell packet is to be transmitted in a loop back queue from the selected ADSL line unit to the ABCU. In an embodiment, the second routing tag byte further comprises a plurality of reserved bits temporally preceding the cell type indicator bits.

In an embodiment, data bits in each of the cell packets which are transmitted downstream from the ABCU to the ADSL line units are referenced by a clock signal having rising and falling edges with a 50% duty cycle. In an embodiment, the data bits are transmitted on both the rising and falling edges of the clock signal, thereby producing a data rate which is twice the clock frequency for downstream transmission of the data bits. In a further embodiment, the data bits are transmitted with a phase shift of 90° with respect to the clock signal.

In an embodiment in which the encoded internal cell does not have a sufficient bit length to occupy a cell packet completely, unused bits are padded after the encoded internal cell to fill up the cell packet. In an embodiment in which the total length of the cell packets assigned to an ADSL frame is not sufficient to occupy the ADSL frame completely, unused bytes are padded after the cell packets to fill up the ADSL frame. In an embodiment in which the internal cell in each cell packet is encoded, the unused bits are not encoded.

In accordance with the present invention, a communications system for downstream transmission of data roughly comprises:

(a) an asymmetrical digital subscriber line (ADSL) bank control unit (ABCU) comprising a plurality of cell buses;

(b) a plurality of sets of data lines and a plurality of clock lines connected to the cell buses; and (c) a plurality of ADSL line units arranged in a plurality of rows, the ADSL line units in each row connected to a respective one of the cell buses through a respective one of the sets of data lines and a respective one of the clock lines, wherein data bits are transmitted within a plurality of internal cells in a plurality of cell packets in an ADSL frame through the data lines from the ABCU to the ADSL line units, wherein a clock signal is provided through each of the clock lines, wherein frame boundaries of the ADSL frame are synchronized by using a subscriber bus interface (SBI) frame consisting of a predetermined number of SBI time slots, the number of cell packets in the ADSL frame different from the number of SBI time slots in the SBI frame, and wherein each of the internal cells comprises a plurality of routing tag bytes, a plurality of header bytes, and a plurality of payload bytes.

In an embodiment, each of the ADSL line units comprises a plurality of destination ports, and the routing tag bytes in each of the internal cells comprise a first routing tag byte and a second routing tag byte. In an embodiment, the first routing tag byte comprises a plurality of card slot bits to designate a card slot number for a selected one of the ADSL line units to which the cell packet is to be transmitted from the ABCU. In a further embodiment, the first routing tag byte further comprises a version indicator bit capable of indicating whether only one cell packet is transmitted from the ABCU to the ADSL line units through all of the cell buses at a time or different cell packets are transmitted simultaneously from the ABCU to different rows of ADSL line units through different cell buses, respectively.

In an embodiment, the second routing tag byte comprises a plurality of cell type indicator bits. In an embodiment, each of the ADSL line units further comprises a router to direct the cell packet to at least one of the destination ports based upon the cell type indicator bits. In an embodiment, the cell type indicator bits are capable of indicating a selected one of the destination ports as a unicast destination for the cell packet. In a further embodiment, the router in the ADSL line unit directs the cell packet to the selected unicast destination port based upon the cell type indicator bits.

In an embodiment, a plurality of multicast groups are provided to include different combinations of downstream destinations. In a further embodiment, the cell type indicator bits are further capable of indicating a selected one of the multicast groups for the downstream transmission of the cell packet. Each of the multicast groups consists of more than one of the destination ports. In this embodiment, the router is capable of directing the cell packet to the destination ports in the selected multicast group based upon the cell type indicator bits.

In an embodiment, the cell buses for transmitting the data bits downstream from the ABCU to the ADSL line units comprise high speed cell buses (HSCBs). In a further embodiment, the system further comprises an additional ABCU having a plurality of cell buses each connected to a respective row of ADSL line units to provide redundancy and fault protection for downstream transmission of the cell packets.

Advantageously, the ADSL downstream high speed cell bus interface protocol according to the present invention allows an existing channel bank backplane to support broadband ADSL traffic by implementing at least one ABCU in a conventional channel bank and plugging a plurality of broadband ADSL line units into existing line card slots on the channel bank backplane. Furthermore, data integrity on the channel bank backplane can be enhanced by encoding the internal cells in the cell packets of an ADSL frame in an embodiment according to the present invention.

Furthermore, in an embodiment in which the data bits are transmitted on both the rising and falling edges of a clock signal with a phase shift, signal frequency over the backplane traces along which the data lines and the clock lines run between the ABCU and the ADSL line units can be reduced. A cleaner clock signal can be provided to the ADSL line units because the clock frequency is lower than the data rate. Furthermore, in an embodiment in which the frame boundaries of the ADSL frame is derived from a standard SBI frame, frame synchronization can be achieved with reduced design complexity.

Furthermore, in an embodiment in which each of the cell packets comprises a plurality of routing tag bytes, a plurality of card slot bits are provided to designate a selected ADSL line unit for receiving the cell packet, and a plurality of cell type indicator bits are provided for further downstream transmission of the cell packet from the selected ADSL line unit. In an embodiment, a version indicator bit is provided in one of the routing tag bytes to indicate the format in which the routing tag bytes are implemented.

BRIEF DESCRIPTION OF TEE DRAWINGS

The present invention will be described with respect to particular embodiments thereof, and references will be made to the drawings in which.

Figure 6:
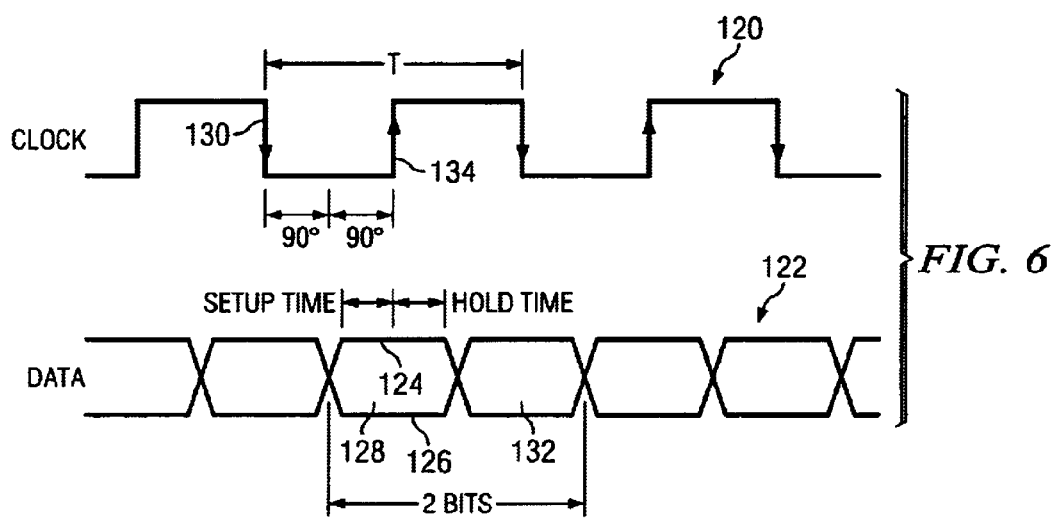
Figure 7:
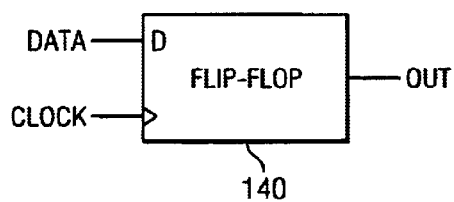

FIG. 6 shows a diagram illustrating a clock signal and a data signal which is transmitted on both the rising and falling edges of the clock signal with a predetermined phase shift in an embodiment according to the present invention; and FIG. 7 shows a flip-flop with a clock input providing a timing reference for the data signal as shown in FIG. 6 in an embodiment according to the present invention.

DETAILED DESCRIPTION

Figure 1:
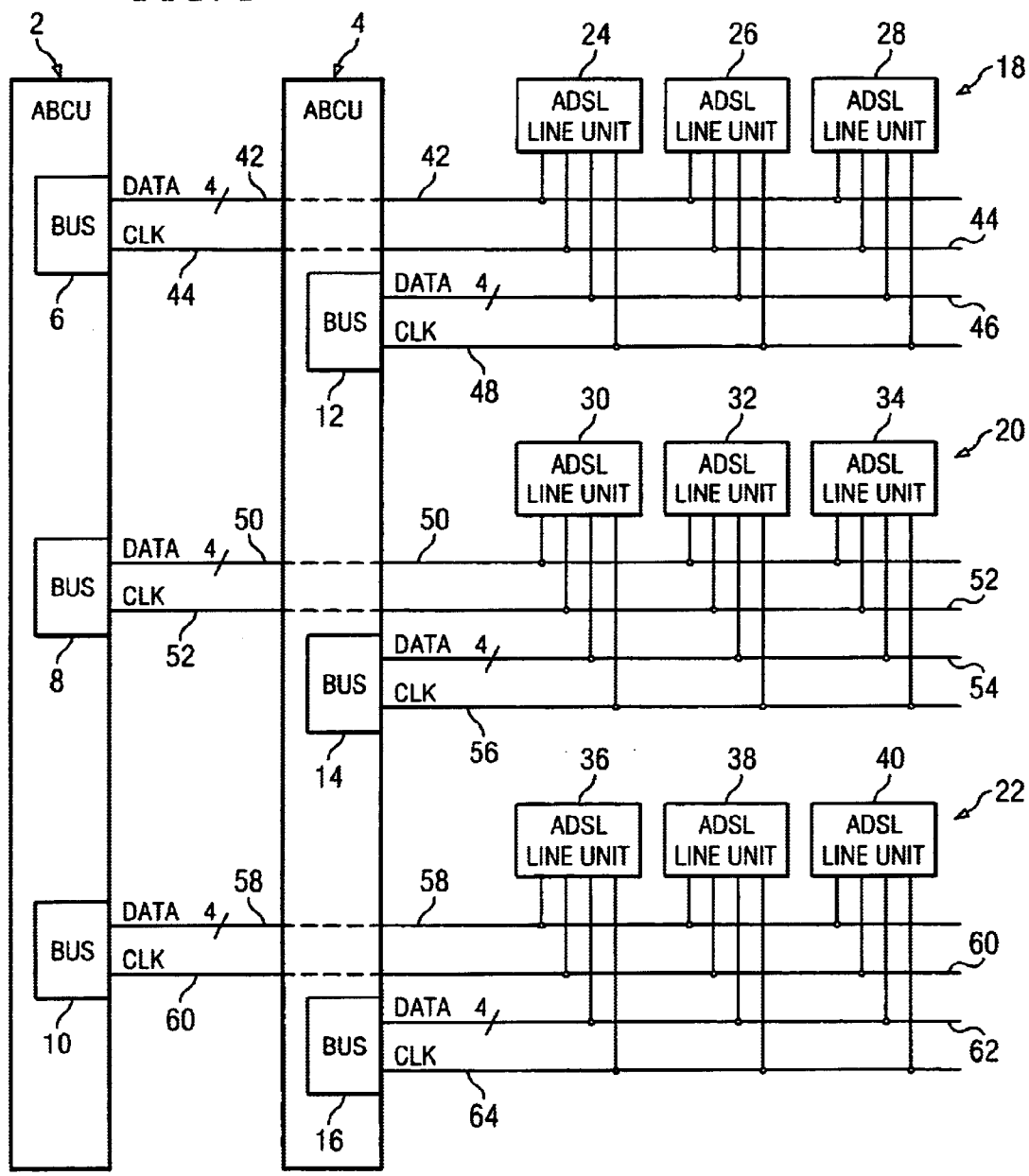
FIG. 1 is a block diagram showing an embodiment of a communications system for downstream transmission of asymmetrical digital subscriber line (ADSL) cell packets in an ADSL frame according to the present invention.

FIG. 1 shows a block diagram of an embodiment of a system for downstream transmission of an asymmetrical digital subscriber line (ADSL) frame using an ADSL downstream high speed cell bus interface protocol according to the present invention. In FIG. 1, two ADSL bank control units (ABCUs) 2 and 4 are implemented for redundancy and fault protection in the system for downstream transmission of ADSL cell packets in a channel bank. Only one of the ABCUs 2 and 4 is operational at any instant. For example, the first ABCU 2 may be implemented as a primary ABCU while the second ABCU 4 is implemented as a back-up ABCU. In an embodiment, only the primary ABCU 2 transmits ADSL cell packets downstream during normal operations unless a problem occurs within the primary ABCU 2. The back-up ABCU 4, which is identical to the primary ABCU 2, is activated to transmit ADSL cell packets downstream only when the primary ABCU 2 is non-operational.

The primary ABCU 2 has a plurality of cell buses 6, 8 and 10 while the back-up ABCU 4 has a plurality of cell buses 12, 14 and 16. In an embodiment, all of the cell buses 6, 8, 10, 12, 14 and 16 are high speed cell buses (HSCBs) for broadband ADSL traffic, operating at a higher data rate than that of a conventional narrowband bus. In an embodiment, the primary and back-up ABCUs 2 and 4 may be implemented in a conventional channel bank to replace conventional bank control units (BCUs) for conventional narrowband plain old telephone service (POTS) traffic. A conventional channel bank is usually implemented on a standard equipment rack having a standard channel bank backplane which is known to a person skilled in the art. A plurality of metallic line traces are usually provided on the channel bank backplane and run parallel to each other on the backplane in a conventional manner known to a person skilled in the art.

A plurality of standard line card slots are provided on the conventional channel bank backplane to allow conventional POTS line cards to be plugged in to establish electrical connections between the conventional POTS line cards and the conventional narrowband BCUs through the backplane metallic line traces. In an embodiment, an existing conventional channel bank can be utilized for supporting broadband downstream ADSL traffic by plugging a plurality of broadband ADSL line units into the existing line card slots on the conventional channel bank backplane and replacing the conventional BCUs for narrowband POTS traffic with broadband ABCUs in the channel bank for transporting ADSL cell packets using the ADSL downstream high speed cell bus interface protocol according to the present invention.

As shown in FIG. 1, the ADSL line units, also called ADSL line cards, are arranged in a plurality of rows 18, 20 and 22. The first row 18 includes ADSL line units 24, 26 and 28 while the second row 20 includes ADSL line units 30, 32 and 34. The third row 22 includes ADSL line units 36, 38 and 40. The number of ADSL line units in each row can be flexibly increased or decreased depending upon the need. Furthermore, the number of ADSL line units along the different rows need not be identical to each other. In FIG. 1, the ADSL line units 24, 26 and 28 in the first row 18 are connected to the first cell bus 6 of the primary ABCU 2 through a set of four parallel data lines 42 and a single clock line 44.

In an embodiment in which the ABCU and the ADSL line units are implemented in a conventional channel bank, five parallel metallic line traces are provided on the backplane to serve as the four data lines 42 and the clock line 44. In this embodiment, the four data lines 42 transmit four bits of data in parallel, or 0.5 byte of data simultaneously. The clock line 44 is implemented as a one-bit clock trace on the backplane in an embodiment. In an embodiment in which the back-up ABCU 4 is provided in addition to the primary ABCU 2, an additional set of four-bit data lines 46 and an additional clock line 48 are provided to establish electrical connections between the first cell bus 12 of the back-up ABCU 4 and the first row 18 of ADSL line units 24, 26 and 28.

In a similar manner, the ADSL line units 30, 32 and 34 along the second row 20 are connected to the second cell bus 8 of the primary ABCU 2 through a set of four-bit data lines 50 and a one-bit clock line 52. In an embodiment in which the back-up ABCU 4 is also provided in the channel bank, the ADSL line units 30, 32 and 34 in the second row 20 are also connected to the second cell bus 14 of the back-up ABCU 4 through another set of four-bit data lines 54 and a one-bit clock line 56.

Furthermore, the ADSL line units 36, 38 and 40 in the third row 22 are connected to the third cell bus 10 of the primary ABCU 2 through an additional set of four-bit data lines 58 and an additional one-bit clock line 60. Similarly, in an embodiment in which the back-up ABCU 4 is also implemented in the channel bank, the ADSL line units 36, 38 and 40 in the third row 22 are also connected to the third cell bus 16 of the back-up ABCU 4 through four-bit data lines 62 and a one-bit clock line 64.

Additional rows of ADSL line units may also be provided in a different embodiment depending upon the availability of additional backplane traces and the capacity of each ABCU. The maximum number of ADSL line units which can be implemented in a channel bank is limited by the number of card slot bits assigned to one of the routing tag bytes in an embodiment of the ADSL downstream high speed cell bus interface protocol according to the present invention, which will be described in detail below. Furthermore, additional ABCUs may be implemented for further redundancy depending upon the need.

Figure 2:
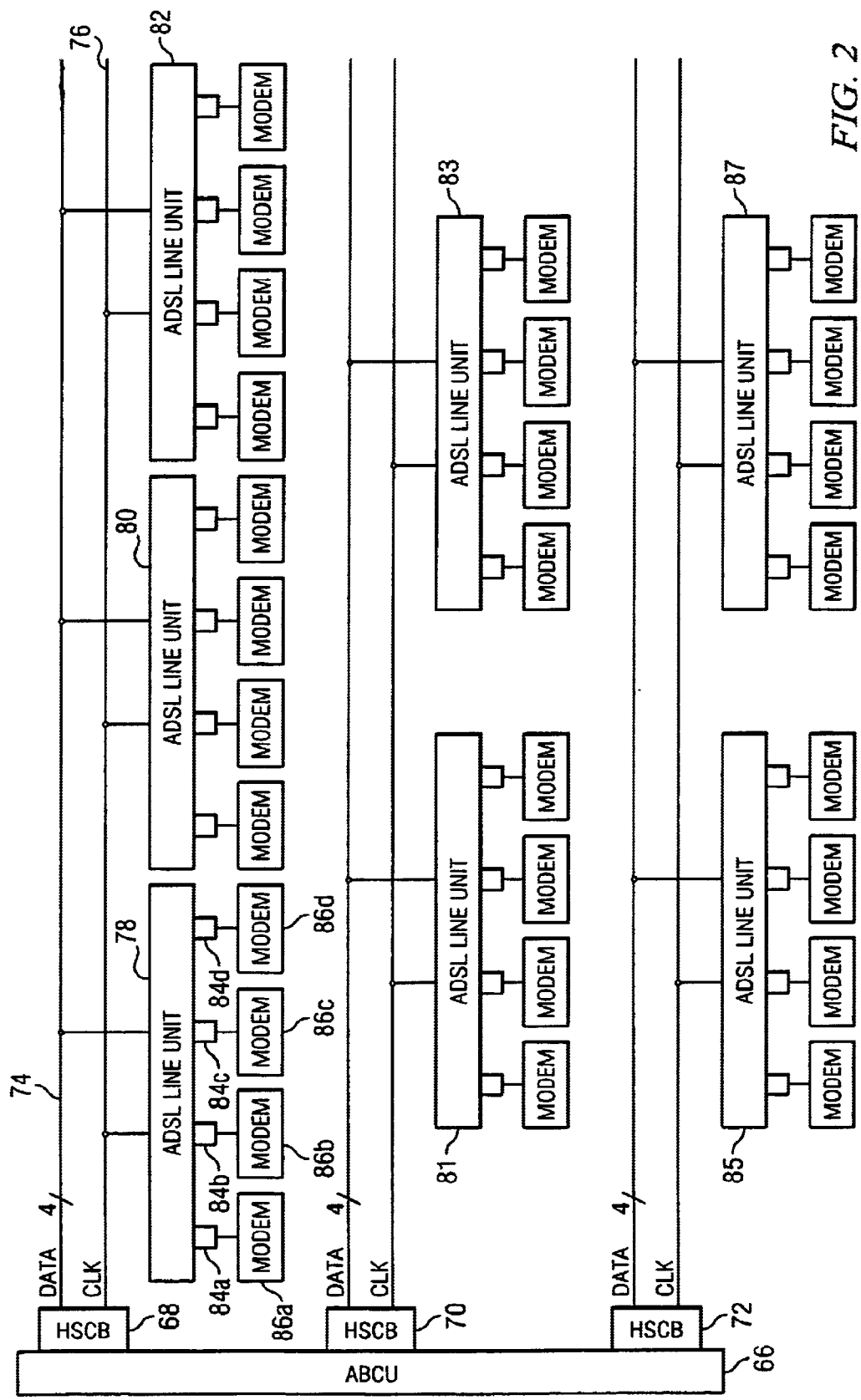
FIG. 2 shows a block diagram of an embodiment of the system according to the present invention, with each of the ADSL line units having a plurality of destination ports for downstream transmission of the cell packets.

FIG. 2 shows a block diagram of an embodiment of the communications system for downstream transmission of ADSL cell packets according to the present invention, with a single ABCU 66 implemented in a channel bank to transmit broadband ADSL cell packets to a plurality of ADSL line units. As shown in FIG. 2, the ABCU 66 comprises a plurality of high speed cell buses (HSCBs) 68, 70 and 72 for outputting data and clock signals. The HSCBs 68, 70 and 72 are capable of transporting high speed downstream ADSL traffic at a higher data rate than that achieved by conventional time division multiplex (TDM) buses in a conventional narrowband BCU for downstream transmission of conventional narrowband POTS signals.

As shown in FIG. 2, the first HSCB of the ABCU 66 is connected to a set of four-bit data lines 74 and a one-bit clock line 76. A plurality of ADSL line units 78, 80 and 82, which are positioned in a single row, are connected to the first HSCB 68 of the ABCU 66 through the set of four-bit data lines 74 and the one-bit clock line 76. Furthermore, additional ADSL line units such as line units 81, 83, 85 and 87 may be connected to the second and third HSCBs 70 and 72 through additional sets of four-bit data lines and clock lines. In an embodiment, the backplane traces of a conventional channel bank may be used as data lines and clock lines for downstream ADSL traffic from the ABCU to the ADSL line units using the ADSL downstream high speed cell bus interface protocol according to the present invention.

As shown in FIG. 2, each of the ADSL line units comprises a plurality of destination ports for further transmission of an ADSL cell packet downstream. For example, the ADSL line unit 78 includes four destination ports 84a, 84b, 84c and 84d for downstream transmission of ADSL cell packets to different ADSL modems. For example, four ADSL modems 86a, 86b, 86c and 86d are connected to the destination ports 84a, 84b, 84c and 84d of the ADSL line unit 78, respectively. Each ADSL cell packet may be transported downstream from the ADSL line unit to only one of the destination ports or to a plurality of destination ports, depending upon whether the cell packet is of a unicast cell type or of a multicast cell type based upon the cell type indicator bits in one of the routing tag bytes in an embodiment of the ADSL downstream high speed cell bus interface protocol according to the present invention, which will be described in detail below.

Figure 3:
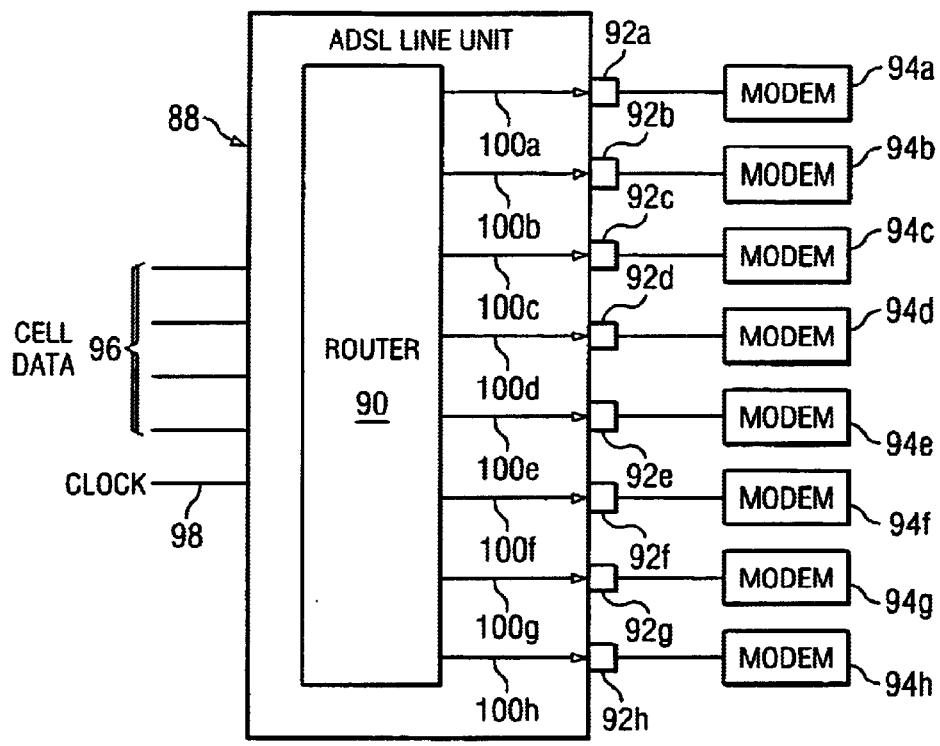
FIG. 3 shows an embodiment of one of the ADSL line units in the system according to the present invention, with a router for further downstream transmission of a cell packet from the ADSL line unit to one or more of the destination ports.

FIG. 3 shows an embodiment of an ADSL line unit 88 which comprises a router 90 for routing the data carried by an ADSL cell packet to one or more downstream destination ports in an embodiment of the ADSL downstream high speed cell bus interface protocol according to the present invention. The router 90 in the ADSL line card 88 directs an ADSL cell packet to one of eight downstream destination ports 92a, 92b, 92c, . . . 92h if the cell packet is of a unicast cell type, or to more than one of the downstream destination ports 92a, 92b, 92c, . . . 92h if the cell packet is of a multicast cell type. Eight ADSL modems 94a, 94b, 94c, . . . 94h are connected to the downstream destination ports 92a, 92b, 29c, . . . 92h, respectively.

An ADSL cell packet is transported to the ADSL line unit 88 through a set of four-bit data lines 96 in the embodiment shown in FIG. 3. A clock signal is transmitted to the ADSL line unit 88 through a one-bit clock line 98. When the cell type indicator bits assigned to one of the routing type bytes in a cell packet indicate to the router 90 in the ADSL line unit 88 that the cell packet is of a unicast cell type, the router 90 directs the cell packet to one of the downstream destination ports 92a, 92b, 92c, . . . 92h which is selected as the unicast destination.

A plurality of downstream queues 100a, 100b, 100c, . . . 100h are provided for the downstream destination ports 92a, 92b, 92c, . . . 92h, respectively. The cell packet is transmitted to the selected downstream destination port which is connected to a respective ADSL modem via a respective downstream queue. For example, if the cell type indicator bits in the cell packet indicate to the router that destination port 92d is the selected unicast destination which is intended to receive the cell packet, the router 90 transmits the cell packet to the destination port 92d via the downstream queue 100d.

The cell type indicator bits assigned to one of the routing tag bytes in the cell packet are also capable of indicating that the cell packet is of a multicast cell type to the ADSL line unit in an embodiment. When the cell packet is of a multicast cell type, a multicast group is selected from a plurality of predetermined multicast groups, each of which consists of a plurality of downstream destination ports. Each of the multicast groups may be programmed with destination port numbers designating the destination ports intended to receive the cell packet in a conventional manner known to a person skilled in the art. Each of the multicast groups may consist of two or more downstream destination ports.

It is not necessary that the multicast groups each include the same number of destination ports. One of the multicast groups may consist of all of the destination ports in the ADSL line unit. Some of the multicast groups may consist of destination ports which are non-adjacent to each other. For example, a multicast group may consist of three downstream destination ports 92b, 92d and 92g. In this example, when the cell type indicator bits indicate to the router 90 in the ADSL line unit 88 that a multicast group which consists of destination ports 92b, 92d and 92g is selected for downstream transmission, the router 90 directs the cell packet to be transmitted to the destination ports 92b, 92d, 92g via respective downstream queues 100b, 100d and 100g. Embodiments of the routing tag bytes and the cell type indicator bits for the downstream transmission of an ADSL cell packet using the ADSL downstream high speed cell bus interface protocol according to the present invention will be described in further detail below.

Figure 4:
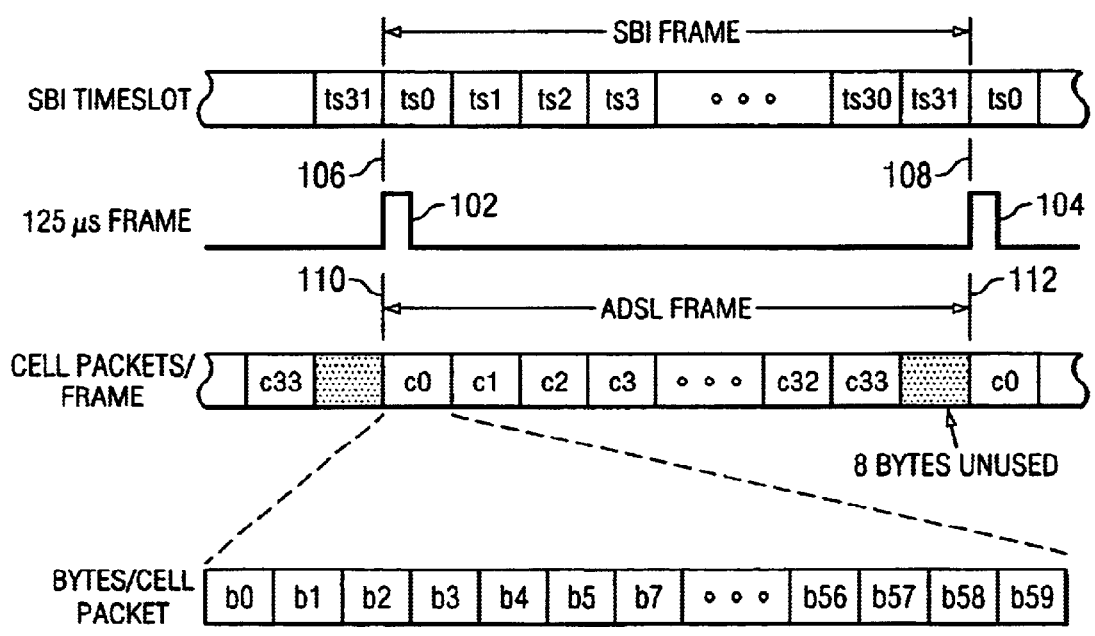
FIG. 4 shows an embodiment of a frame format for the ADSL downstream high speed cell bus interface protocol according to the present invention, with each ADSL frame comprising a plurality of cell packets.

FIG. 4 shows the frame format of an embodiment of an ADSL frame using the ADSL downstream high speed cell bus interface protocol according to the present invention. In this embodiment, an industry-standard subscriber bus interface (SBI) frame is used for synchronizing the frame boundaries of the ADSL frame. A typical standard SBI frame consists of 32 SBI time slots, which are shown as time slots ts0, ts1, ts2, . . . ts31 in FIG. 4. A typical SBI frame has a duration of 125 μs with well-defined frame boundaries. The SBI time slots ts0, ts1, ts2, . . . ts31 are typically used for transmission of conventional narrowband POTS traffic known to a person skilled in the art.

In the embodiment shown in FIG. 4, pulses 102 and 104 are derived from the frame boundaries 106 and 108 of the SBI frame which consists of SBI time slots ts0, ts1, ts2, . . . ts31. The frame-defining pulses 102 and 104 can be derived from the SBI frame by detecting the frame boundaries of the SBI frame or by generating a frame-defining pulse for every 32 SBI time slots, for example. In the embodiment shown in FIG. 4, the leading edges of the frame-defining pulses 102 and 104 correspond to the frame boundaries 106 and 108 of the SBI frame. However, it is not necessary that the leading edges of the frame-defining pulses 102 and 104 coincide exactly with the SBI frame boundaries in a different embodiment. The standard SBI frame is used only for providing a timing reference for an ADSL frame which also has a duration of 125 μs. In an embodiment, the frame-defining pulses 102 and 104 are used for synchronizing the frame boundaries of an ADSL frame which carries a plurality of ADSL cell packets for downstream transmission using the ADSL downstream high speed cell bus interface protocol according to the present invention.

In the embodiment shown in FIG. 4, the frame boundaries 110 and 112 of the ADSL frame are synchronized with the leading edges of the frame-defining pulses 102 and 104, respectively, which are in turn derived from the frame boundaries 106 and 108 of the standard SBI frame having a duration of 125 μs. In the embodiment shown in FIG. 4, thirty-four cell packets designated consecutively as c0, c1, c2, . . . c33 are assigned to the ADSL frame. Furthermore, eight unused bytes are padded after the last cell packet c33 to fill up the ADSL frame. The number of cell packets assigned to each ADSL frame for transporting broadband ADSL traffic is different from the number of SBI time slots assigned to the standard SBI frame for transporting narrowband POTS traffic.

In the embodiment shown in FIG. 4, the first cell packet c0 is allocated sixty bytes numbered consecutively as b0, b1, b2, . . . b59. In a similar manner, other cell packets c1, c2, c3, . . . c33 are each assigned sixty bytes for transporting broadband. downstream ADSL traffic. In the embodiment shown in FIG. 4, the thirty-four cell packets in each ADSL frame consist of a total of 2,040 bytes. When eight unused bytes are padded after the cell packets, the ADSL frame consists of a total of 2,048 bytes.

Figure 5:
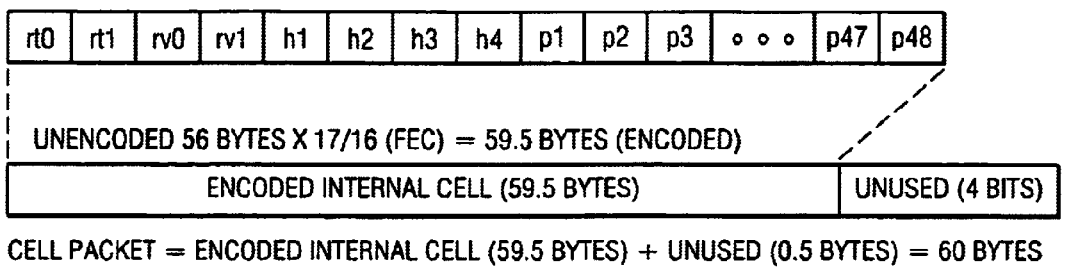
FIG. 5 shows an embodiment of a cell format for each of the cell packets in an ADSL frame using the ADSL downstream high speed cell bus interface protocol according to the present invention.

FIG. 5 shows an embodiment of a cell format for each of the cell packets in an ADSL frame in accordance with the ADSL downstream high speed cell bus interface protocol of the present invention. An internal cell is provided for each cell packet before it is encoded and assigned to the cell packet for downstream transmission for an ABCU to an ADSL line unit. In the embodiment shown in FIG. 5, the internal cell consists of two routing tag bytes rt0 and rt1, two reserved bytes rv0 and rv1 temporally subsequent to the routing tag bytes, four header bytes h1, h2, h3 and h4 temporally subsequent to the reserved bytes, and forty-eight payload bytes p1, p2, p3, . . . p48 temporally subsequent to the header bytes.

In this embodiment, the unencoded internal cell consists of 56 bytes. Header information may be included in the header bytes h1, h2, h3 and h4 in a conventional manner known to a person skilled in the art. Payload data are assigned to the forty-eight payload bytes p1, p2, p3, . . . p48 in a conventional manner known to a person skilled in the art. The downstream routing of each of the cell packets in an ADSL frame is determined by the routing tag bytes rt0 and rt1 in an embodiment according to the present invention.

In an embodiment, the internal cell which consists of 56 bytes is encoded by applying convolutional forward error correction (FEC) encoding to the internal cell. Conventional convolutional FEC encoding algorithms are well known to a person skilled in the art. An encoded internal cell typically has a longer bit length than an unencoded internal cell carrying the same data. For example, an encoded internal cell having a length of 56 bytes may be encoded by using a conventional convolutional FEC algorithm to generate an encoded internal cell having a length of 59.5 bytes. In an embodiment, convolutional FEC encoding is applied only to the internal cells in an ADSL frame and not to the eight unused bytes at the end of the ADSL frame.

Although an encoded internal cell generated by a typical FEC error correction encoding algorithm usually has a longer bit length than an unencoded internal cell carrying the same data, error correction encoding can significantly reduce the probability of error when the cell packets in an ADSL frame are transmitted along typical channel bank backplane traces, because "unclean" signals may be present along the metallic backplane traces of a conventional channel bank designed for narrowband POTS traffic. In the embodiment shown in FIG. 5, four unused bits are padded after the encoded internal cell to fill up the ADSL cell packet, which consists of a total of 60 bytes. In an embodiment, convolutional FEC encoding is applied only to the internal cell and not to the four unused bits in the ADSL cell packet.

The routing tag bytes rt0 and rt1 as shown in FIG. 5 carry different types of routing tag bits for determining the manner in which the cell packet is to be transmitted downstream. An example of a routing tag format for the two routing tag bytes in each ADSL cell packet in an embodiment of the ADSL downstream high speed cell bus interface protocol according to the present invention is illustrated in Table A below:

TABLE A

| RTAG0 | | | | | | | | RTAG1 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| V | R | S | S | S | S | S | S | RT | R | R | T | T | T | T | T |

In Table A, the letter "V" signifies a version indicator bit, the letter "R" signifies a reserved bit, the letter "S" signifies a card slot bit, and the letter "T" signifies a cell type indicator bit. In Table A, the first routing tag byte RTAG0 temporally precedes the second routing tag byte RTAG1. Within each routing tag byte, bit 7 is the most significant bit and bit 0 is the least significant bit. Within RTAG0, the last six bits RTAG0 (5:0) are allocated as card slot bits which carry a card slot number for designating one of the ADSL line units selected to receive the ADSL cell packet from the ABCU.

Each of the line card slots in the channel bank to which the ADSL line units are connected is identified by a unique slot identification number. In the embodiment shown in FIG. 1, all of the ADSL line units in each row are connected to the same cell bus of the primary ABCU through the same set of data lines and clock line. Upon receiving an ADSL cell packet from the same cell bus through the same set of data lines, each of the ADSL line units in the same row compares the card slot number carried by the card slot bits of the first routing tag byte RTAG0 to the slot identification number for the ADSL line unit.

If the ADSL line unit determines that the card slot number carried by the card slot bits in the first routing tag byte RTAG0 matches the slot identification number for the ADSL line unit, the ADSL line unit with the matching slot identification number is the one selected for further downstream transmission of the cell packet. The cell packet is then transferred to the router in the selected ADSL line card for further routing of the cell packet downstream.

If the ADSL line unit determines that the card slot number carried by the card slot bits in the first routing tag byte RTAG0 is different from the slot identification number for the ADSL line unit, the ADSL line unit simply ignores the cell packet because it is not the line unit selected to receive the cell packet for further transmission downstream.

In the embodiment of the routing tag format illustrated in Table A, six bits are allocated as the card slot bits. When six bits are allocated as the card slot bits, a maximum of 64 ADSL line units can be connected to the ABCU. The decimal card slot numbers for identifying the line card slots of the ADSL line units are in the range of 0 to 63. In the embodiments shown in FIGS. 1 and 2, a maximum of 64 ADSL line units may be plugged into the line card slots along three sets of channel bank backplane traces in three different rows if the routing tag format of Table A is used, even though it is not necessary that each of the rows consist of the same number of ADSL line units.

In the embodiment of the routing tag format as shown in Table A, the first routing tag byte RTAG0 further comprises a reserved bit temporally preceding the five card slot bits RTAG0 (5:0). Furthermore, the first bit of the first routing tag byte RTAG0 is allocated as a version indicator bit in an embodiment in which a plurality of cell buses are provided on an ABCU for transmitting ADSL cell packets to different rows of ADSL line units. The version indicator bit is capable of indicating whether only one cell packet is transmitted from the ABCU to the ADSL line units through all of the data buses at a time or different cell packets are transmitted simultaneously from the ABCU to different rows of ADSL line units through different data buses, respectively.

For example, if the version indicator bit in the first routing tag byte is "0", it signifies to the ADSL line units that the same cell packet is transmitted to all of ADSL line units from all of the cell buses on the ABCU at the same time. On the other hand, if the version indicator bit in the first routing tag byte is "1", it signifies to the ADSL line units that different cell packets are transmitted from different cell buses on the ABCU to different rows of ADSL line units simultaneously.

In an embodiment, ABCUs which include multiple high speed cell buses such as those shown in the embodiments of FIGS. 1 and 2 are able to increase the total channel bank downstream throughput by transmitting different cell packets to different rows of ADSL line units through different cell buses. The version indicator bit is capable of indicating the format in which the routing tag bytes are implemented.

Arrangements of routing tag bits within the first routing tag byte RTAG0 other than that which is shown in Table A above may also be made within the scope of the present invention. For example, if seven bits RTAG0 (6:0) of the first routing tag byte RTAG0 are allocated as card slot bits to carry a card slot identification number for a selected ADSL line unit, a maximum of 128 ADSL line units may be connected to an ABCU. Furthermore, the version indicator bit and the card slot bits may be arranged in a different order in a different embodiment. For example, the card slot bits may be assigned to the higher order bits in the first routing tag byte RTAG0 while the version indicator bit is assigned to a lower order bit. The number of card slot bits assigned to the first routing tag byte RTAG0 may be increased or decreased in a different embodiment, depending upon the maximum number of ADSL line units that need be plugged into the line card slots of an existing channel bank.

Table A also shows an embodiment of the routing tag format for the second routing tag byte RTAG1. In this embodiment, five bits RTAG1 (4:0) are allocated as cell type indicator bits to the second routing tag byte RTAG1. In this embodiment, the second routing tag byte RTAG1 further comprises three reserved bits RTAG1 (7:5) temporally preceding the cell type indicator bits RTAG1 (4:0). An example of a bit format for the cell type indicator bits RTAG1 (4:0) is illustrated in Table B below:

TABLE B

| RTAG1(4:0) | Cell Type | Destination of Cells |
| --- | --- | --- |
| 00000 | Idle Cell | Discard |
| 00001 | CPU Cell | CBDL downstream queue |
| 00010 | HSCB Loopback Cell | HSCB loopback queue |
| 01000 | Unicast Port 0 Cell | HSCB downstream queue 0 |
| 01001 | Unicast Port 1 Cell | HSCB downstream queue 1 |
| 01010 | Unicast Port 2 Cell | HSCB downstream queue 2 |
| 01011 | Unicast Port 3 Cell | HSCB downstream queue 3 |
| 01100 | Unicast Port 4 Cell | HSCB downstream queue 4 |
| 01101 | Unicast Port 5 Cell | HSCB downstream queue 5 |
| 01110 | Unicast Port 6 Cell | HSCB downstream queue 6 |
| 01111 | Unicast Port 7 Cell | HSCB downstream queue 7 |
| 11000 | Multicast Group 0 | HSCB downstream queue(s) |
| 11001 | Multicast Group 1 | HSCB downstream queue(s) |
| 11010 | Multicast Group 2 | HSCB downstream queue(s) |
| 11011 | Multicast Group 3 | HSCB downstream queue(s) |
| 11100 | Multicast Group 4 | HSCB downstream queue(s) |
| 11101 | Multicast Group 5 | HSCB downstream queue(s) |
| 11110 | Multicast Group 6 | HSCB downstream queue(s) |
| 11111 | Multicast Group 7 | HSCB downstream queue(s) |
| All others | Reserved | |

The embodiment of the bit format as shown in Tables A and B for the second routing tag byte RTAG1 is applicable to the downstream routing of an ADSL cell packet by an ADSL line unit which has eight downstream destination ports. For example, the ADSL line unit 88 as shown in FIG. 3 has a router 90 which is capable of directing ADSL cell packets to eight destination ports 92a, 92b, 92c, . . . 92h through a plurality of high speed cell bus (HSCB) downstream queues 100a, 100b, 100c, . . . 100h, respectively. The destination ports 92a, 92b, 92c, . . . 92h are connected to transmit the cell packets further downstream to a plurality of ADSL modems 94a, 94b, 94c, . . . 94h.

In an embodiment, an ADSL cell packet is directed by the router in the ADSL line unit to only one of the destination ports selected to receive the cell packet. In this embodiment, the destination port which is intended to receive the cell packet is called a unicast destination port. Referring to Table B, eight unicast destination ports are designated by the cell type indicator bits RTAG1 (4:0) as 01000, 01001, 01010, . . . 01111. In this embodiment, the first two cell type indicator bits RTAG1 (4:3), which are 01 for all of the unicast destinations, signify to the ADSL line unit that the cell packet is of a unicast cell type.

If the ADSL cell packet is of a unicast cell type, the three subsequent cell type indicator bits RTAG1 (2:0) designate the unicast destination port selected to receive the ADSL cell packet. Up to eight unicast destination ports can be provided for each ADSL line unit if three cell type indicator bits are allocated to represent the port numbers for the unicast destination ports. In an embodiment, the three subsequent cell type indicator bits RTAG1 (2:0) are simply the binary representations of decimal port numbers for unicast destination ports 0 to 7. When the router in the ADSL line unit receives the cell type indicator bits which designate a selected unicast destination port to which the cell packet is to be transmitted, the router directs the cell packet to the selected unicast destination port via a respective HSCB downstream queue.

In a further embodiment, the cell type indicator bits in the second routing tag byte RTAG1 are further capable of indicating to the ADSL line unit that the ADSL cell packet is of a multicast cell type. When an ADSL cell packet is of a multicast cell type, it is capable of being transmitted to more than one destination. A plurality of multicast groups are provided in an embodiment to allow different combinations of downstream destination ports to be included within the multicast groups. Each of the multicast groups may consist of a different number of destination ports.

In an embodiment, two or more downstream destination port numbers are programmed in each of the multicast groups in a conventional manner known to a person skilled in the art. For example, Multicast Group 0 may be programmed to consist of destination port numbers 0, 2, 5 and 7, whereas Multicast Group 1 may be programmed to consist of destination port numbers 2, 3 and 6. Any combination of downstream destination port numbers may be programmed in each of the multicast groups. One of the multicast groups may be programmed to consist of all of the downstream destination ports, for example.

In the embodiment illustrated in Table B, eight multicast groups numbered from 0 to 7 are designated by cell type indicator bits 11000, 11001, 11010, . . . 11111. In this embodiment, the first two bits RTAG1 (4:3) of the cell byte indicator bits RTAG1 (4:0) are 11 for all of the multicast groups. The three subsequent cell type indicator bits RTAG1 (2:0) are the binary representations of decimal group numbers for multicast groups 0 to 7. Therefore, when the first two cell type indicator bits RTAG1 (4:3) carry binary numbers 11, it signifies to the ADSL line unit that the ADSL cell packet is of a multicast cell type.

If the ADSL cell packet is of a multicast cell type, the next three cell type indicator bits RTAG1 (2:0) indicate to the router in the ADSL line unit which one of the multicast groups is selected for further downstream transmission. Upon receiving the cell type indicator bits which indicate that the cell packet is of a multicast cell type, the router directs the cell packet to the destination ports according to the destination port numbers programmed in the selected multicast group via a plurality of HSCB downstream queues. For example, if the selected multicast group consists of port numbers 0, 2, 5 and 7 representing destination ports 92a, 92c, 92f and 92h as shown in FIG. 3, the cell packet is transmitted to these destination ports via HSCB downstream queues 100a, 100c, 100f and 100h, respectively.

Although Table B shows an example of a bit format for the cell type indicator in the second routing tag byte RTAG1 in which eight multicast groups are included, additional multicast groups may be programmed and identified by different combinations of cell type indicator bits RTAG1 (4:0). For example, some of the cell type indicator bit combinations which are listed as "reserved" in Table B can be used to designate additional multicast groups in a different embodiment. For example, up to eight additional multicast groups may be designated by assigning binary numbers 10 to the first two bits RTAG1 (4:3) of the cell type indicator bits RTAG1 (4:0). There are also reserved cell type indicator bit combinations with the first two bits RTAG1 (4:3) carrying binary numbers 00 which can also be used to designate additional multicast groups, for example.

If the ADSL line unit has more than eight destination ports, additional unicast destination port numbers may be allocated to at least some of the combinations of the cell type indicator bits RTAG1 (4:0) which are listed as "reserved" in Table B. For example, at least some of the "reserved" cell type indicator bit combinations with the first two bits carrying binary numbers 00 or 10 may be used to designate additional unicast port numbers. Furthermore, one or more of the reserved bits RTAG1 (7:5) in the second routing tag byte RTAG1 may be allocated as one or more additional cell type indicator bits if necessary to designate additional unicast port numbers or additional multicast groups.

In an embodiment, the cell type indicator bits are also capable of indicating additional cell types for the ADSL cell packet other than the unicast and multicast cell types described above. In a further embodiment, the cell type indicator is capable of signifying to the ADSL line unit that the cell packet comprises an idle cell. In the embodiment of the bit format for the cell type indicator bits RTAG1 (4:0) as illustrated in Table B, cell type indicator bits carrying binary numbers 00000 indicate that the cell packet comprises an idle cell. Upon receiving an indication by the cell type indicator bits that the cell packet comprises an idle cell, the ADSL line unit simply discards the cell packet in an embodiment. The idle cell which is discarded by the ADSL line unit is not transmitted further downstream to any of the destination ports.

In a further embodiment, the cell type indicator bits are further capable of signifying to the ADSL line unit that the ADSL cell packet comprises a central processing unit (CPU) cell. The CPU cell may be used for functions other than the transmission of payload data to one or more of the destination ports. For example, the CPU cell may comprise an operations and maintenance (OAM) cell which is used for operations and maintenance functions of the channel bank. In an embodiment, the ADSL line unit transmits the CPU cell via a cell bus data link (CBDL) downstream queue upon receiving an indication by the cell type indicator bits RTAG1 (4:0) that the cell packet comprises a CPU cell. In the embodiment of the bit format for the cell type indicator bits RTAG1 (4:0) as illustrated in Table B, cell type indicator bits carrying binary numbers 00001 indicate that the ADSL cell packet is of a CPU cell type.

In an embodiment, the cell type indicator bits are further capable of signifying to the ADSL line unit that the cell packet comprises a high speed cell bus (HSCB) loop back cell. Upon receiving an indication by the cell type indicator bits RTAG1 (4:0) that the cell packet comprises an HSCB loop back cell, the ADSL line unit transmits the cell packet upstream to the ABCU in a loop back queue. An ADSL cell packet which comprises an HSCB loop back cell is not transmitted further downstream to any of the downstream destination ports. In the embodiment of the bit format for the cell type indicator bits RTAG1 (4:0) shown in Table B, cell type indicator bits carrying binary numbers 00010 indicate that the cell packet is of an HSCB loop back cell type. In another embodiment, other combinations of cell type indicator bits which are not used for designating either the unicast destinations or the multicast groups can also be used to designate special cell types for the cell packet.

Tables A and B illustrate a specific example of a routing tag format for directing downstream ADSL traffic in a channel bank using the ADSL downstream high speed cell bus interface protocol according to the present invention. Various arrangements of the version indicator bit, the card slot bits and the cell type indicator bits can be made within the two routing tag bytes RTAG0 and RTAG1 within the scope of the present invention. Furthermore, various combinations of cell type indicator bits can be used to designate unicast and multicast cell types as well as special cell types in a variety of manners within the scope of the present invention.

The reserved bits RTAG0(6) and RTAG1 (7:5) in Table A may be used as additional card slot bits and additional cell type indicator bits to provide numerical allocations for additional ADSL line unit card slots as well as additional unicast destinations or multicast groups, for example. Furthermore, the version indicator bit, the card slot bits and the cell type indicator bits may assigned to different routing tag bytes in a different embodiment. For example, the card slot bits may be assigned to the second routing tag byte RTAG1 whereas the cell type indicator bits may be assigned to the first routing tag byte RTAG0.

If additional routing tag bytes are needed, the reserved bytes rv0 and rv1 as shown in FIG. 5 may be used as additional routing tag bytes in a different embodiment. For example, if the four reserved bits in the first two routing tag bytes RTAG0 and RTAG1 as shown in Table A are already used, at least some of the additional card slot bits or cell type indicator bits may be allocated to one or both of the reserved bytes rv0 and rv1 as shown in FIG. 5 for designating additional ADSL line unit card slots, unicast destinations, or multicast groups.

In an embodiment, the data bits in an ADSL cell packet are transmitted on both the rising and falling edges of a clock signal. In an embodiment shown in FIG. 6, a clock signal 120 has a substantially rectangular pulse waveform with a 50% duty cycle. Each clock signal pulse has rising and falling edges. The data bits carried by each of the data lines are shown as a bit stream 122 in FIG. 6. In this embodiment, the data bits in the bit stream are transmitted with a phase shift of 90° with respect to the clock signal. Each data bit in the bit stream carries a binary number of either 1 or 0. The upper bar 124 in the bit stream 122 may represent binary number 1 and the lower bar 126 in the bit stream 122 may represent binary number 0 or visa versa.

In the embodiment shown in FIG. 6, each data bit in the bit stream 122 is transmitted with a phase delay of 90° from a respective rising or falling edge of the clock signal. For example, data bit 128 in the bit stream 122 is delayed by a phase shift of 90°, which corresponds to one-quarter of the period T of the clock signal, with respect to the falling edge 130 of the clock signal 120. The data bit 128 carries a binary number of either 1 or 0. In a similar manner, data bit 132 is delayed by a phase shift of 90° with respect to the rising edge 134 of the clock signal 120.

The phase shift allows adequate set up time for a typical flip-flop, such as a conventional D flip-flop 140 as shown in FIG. 7, to provide a clocking reference for the data bits. With a phase shift of 90°, a sufficiently long set-up time is provided to ensure that the data bits are latched by the clock signal. With a phase shift of 90°, the hold time for the D flip-flop 140 is nearly equal to the set-up time.

As shown in FIG. 6, each clock period T allows two bits of data to be transmitted if the data bits are transmitted on both the rising and falling edges of the clock signal. For example, if a clock signal is transmitted on a clock line at a clock frequency of 16.384 MHz, data bits are transmitted at a bit rate of 32.768 megabits per second (Mbps) on each of the data lines. In the embodiments shown in FIGS. 1 and 2 in which each of the cell buses on an ABCU is connected to a respective row of ADSL line units through a respective set of four parallel data lines and a single clock line, the data bits carried by the four data lines are all transmitted on both the rising and falling edges of the clock signal transmitted along the clock line from the same cell bus to the respective row of ADSL line units.

With four parallel data lines, each of the cell buses on the ABCU transmits data at a throughput of 131.072 Mbps while the clock frequency on the clock line remains at 16.384 MHz. Because of the lower clock frequency on the clock line, a cleaner clock signal can be presented to the ADSL line units while the signal power transmitted over the channel bank backplane traces can be reduced.

In the embodiments shown in FIGS. 1 and 2 in which each ABCU comprises three high speed cell buses (HSCBs) to transmit ADSL cell packets over three separate channels, three separate packets can be transmitted from the HSCBs simultaneously along three separate channels in dependence upon the version indicator bit in the first routing tag byte RTAG0 described above. With four parallel data lines per channel at a channel throughput of 131.072 Mbps, the total channel bank downstream throughput can be as high as 393.216 Mbps if three cell packets are transmitted by the three HSCBs simultaneously upon an indication by the version indicator bit in the first routing tag byte of each cell packet that the cell packets are to be transmitted in a high throughput mode.

The information carried within the routing tag bytes of each cell packet using the ADSL downstream high speed cell bus interface protocol according to the present invention allows flexible sharing of bandwidth among different ADSL line units which are connected to the same HSCB of the ABCU. Furthermore, the routing tag information carried by the routing tag bytes allows the bandwidth on any one of the ADSL line units to be shared among multiple ADSL downstream destination ports as needed.

Furthermore, in a channel bank in which multiple HSCBs are provided on an ABCU, the version indicator bit allows different cell packets to be transmitted simultaneously from different HSCBs in a high throughput mode to increase the total downstream data throughput of the channel bank as needed. Instead of fixed allocations of bandwidths among different line cards in each channel and among different destination ports on each of the line cards in a conventional channel bank, the routing tag information carried by the card slot bits and the cell type indicator bits within the routing tag bytes in an embodiment of the ADSL downstream high speed cell bus interface protocol according to the present invention allows the channel bank to achieve flexible and efficient utilization of the total available bandwidth for ADSL traffic.

The invention has been described with respect to particular embodiments thereof, and numerous modifications can be made which are within the scope of the invention as set forth in the claims.

What is claimed is:

1. A method of data transmission, comprising the steps of:
   (a) synchronizing frame boundaries of an asymmetrical digital subscriber line (ADSL) frame by using a subscriber bus interface (SBI) frame consisting of a predetermined number of SBI time slots;
   (b) assigning a plurality of cell packets to the ADSL frame, the number of cell packets in the ADSL frame different from the number of SBI time slots in the SBI frame; and (c) providing an internal cell for transmission within one of the cell packets, the internal cell comprising a plurality of routing tag bytes and a plurality of payload bytes.

2. The method of claim 1, wherein the SBI frame has a duration of 125 μs and consists of 32 SBI time slots, and wherein the ADSL frame comprises 34 cell packets each consisting of 60 bytes.

3. The method of claim 2, further comprising the step of padding 8 unused bytes after the cell packets in the ADSL frame.

4. The method of claim 1, further comprising the steps of:
(d) encoding the internal cell to generate an encoded internal cell; and
(e) assigning the encoded internal cell to the cell packet.

5. The method of claim 4, wherein the internal cell consists of two routing tag bytes, two reserved bytes temporally subsequent to the routing tag bytes, four header bytes temporally subsequent to the reserved bytes, and 48 payload bytes temporally subsequent to the header bytes.

6. The method of claim 5, wherein the encoded internal cell consists of 59.5 bytes.

7. The method of claim 6, further comprising the step of padding 4 unused bits after the encoded internal cell in the cell packet.

8. The method of claim 4, wherein the step of encoding the internal cell comprises the step of applying convolutional forward error correction encoding to the internal cell.

9. The method of claim 1, wherein the cell packet is capable of being transmitted downstream from an ADSL bank control unit (ABCU) to a plurality of ADSL line units, wherein the routing tag bytes consist of a first routing tag byte and a second routing tag byte, and wherein the first routing tag byte comprises a plurality of card slot bits to designate a card slot number for a selected one of the ADSL line units to which the cell packet is to be transmitted.

10. The method of claim 9, wherein the first routing tag byte further comprises a reserved bit.

11. The method of claim 9, wherein the first routing tag byte further comprises a version indicator bit.

12. The method of claim 11, wherein the ABCU is connected to the ADSL line units through a plurality of data buses each comprising a plurality of data lines and a clock line, and wherein the version indicator bit is capable of indicating whether only one cell packet is transmitted from the ABCU to the ADSL line units through all of the data buses at a time or different cell packets are transmitted simultaneously from the ABCU to the ADSL line units through different data buses.

13. The method of claim 9, wherein the card slot bits consist of 6 bits, and wherein the card slot number is in the range of 0 to 63.

14. The method of claim 9, wherein the second routing tag byte comprises a plurality of cell type bits to indicate to the selected ADSL line unit at least one of a plurality of destination ports to which the cell packet is to be transmitted.

15. The method of claim 14, wherein the second routing tag byte further comprises a plurality of reserved bits.

16. The method of claim 14, wherein the cell type bits are capable of indicating a selected one of the destination ports as a unicast destination for the cell packet.

17. The method of claim 16, further comprising the step of transmitting the cell packet to the unicast destination via a selected one of a plurality of downstream queues based upon the cell type bits.

18. The method of claim 14, wherein the cell type bits are capable of indicating a selected one of a plurality of multicast groups for the cell packet, each of the multicast groups consisting of more than one of the destination ports.

19. The method of claim 18, further comprising the step of transmitting the cell packet to the destination ports in the selected multicast group via a plurality of respective downstream queues based upon the cell type bits.

20. The method of claim 14, wherein the cell type bits consist of 5 bits capable of designating a selected one of at least eight unicast destinations or a selected one of at least eight multicast groups.

21. The method of claim 14, wherein the cell type bits are further capable of carrying an idle cell indicator to signify to the selected ADSL line unit that the cell packet is to be discarded.

22. The method of claim 14, wherein the cell type bits are further capable of carrying a central processing unit (CPU) cell indicator to signify to the selected ADSL line unit that the cell packet is to be transmitted via a cell bus data link (CBDL) downstream queue.

23. The method of claim 14, wherein the cell type bits are further capable of carrying a loop back cell indicator to signify to the selected ADSL line unit that the cell packet is to be transmitted in a loop back queue from the selected ADSL line unit to the ABCU.

24. The method of claim 1, wherein the cell packet comprises a plurality of data bits transmitted downstream from an ADSL bank control unit (ABCU) to a plurality of ADSL line units through a data bus comprising a plurality of data lines and a clock line carrying a clock signal having rising and falling edges, wherein the clock signal has a 50% duty cycle, and wherein the data bits are transmitted on both the rising and falling edges of the clock signal.

25. The method of claim 24, wherein the data bits are transmitted with a phase shift of 90° with respect to the clock signal.

26. A method of data transmission, comprising the steps of:
(a) synchronizing frame boundaries of an asymmetrical digital subscriber line (ADSL) frame by using a subscriber bus interface (SBI) frame as a reference, the SBI frame consisting of a predetermined number of subscriber bus interface (SBI) time slots;
(b) assigning a plurality of cell packets each comprising a plurality of data bytes to the ADSL frame, the number of cell packets in the ADSL frame different from the number of SBI time slots in the SBI frame;
(c) padding at least one unused byte after the cell packets to fill up the ADSL frame;
(d) providing a plurality of internal cells each consisting of first and second routing tag bytes, a plurality of reserved bytes temporally subsequent to the routing tag bytes, a plurality of header bytes temporally subsequent to the reserved bytes, and a plurality of payload bytes temporally subsequent to the header bytes;
(e) encoding the internal cells to generate a plurality of encoded internal cells by applying convolutional forward error correction encoding to the internal cells; and
(f) assigning each of the encoded internal cells to a respective one of the cell packets in the ADSL frame.

27. The method of claim 26, wherein the reserved bytes in each of the internal cells consist of two bytes, wherein the header bytes in each of the internal cells consist of two bytes, and wherein the payload bytes in each of the internal cells consist of 48 bytes.

28. The method of claim 27, wherein each of the encoded internal cells consists of 59.5 bytes.

29. The method of claim 28, further comprising the step of padding 4 unused bits after the encoded internal cell in each of the cell packets.

30. The method of claim 26, wherein each of the cell packets is capable of being transmitted downstream from an ADSL bank control unit (ABCU) to a plurality of ADSL line units, and wherein the first routing tag byte comprises a plurality of card slot bits to designate a card slot number for a selected one of the ADSL line units to which the cell packet is to be transmitted.

31. The method of claim 30, wherein the first routing tag byte further comprises a reserved bit temporally preceding the card slot bits.

32. The method of claim 31, wherein the first routing tag byte further comprises a version indicator bit temporally preceding the reserved bit.

33. The method of claim 32, wherein the ABCU is connected to the ADSL line units through a plurality of data buses each comprising a plurality of data lines and a clock line, and wherein the version indicator bit is capable of indicating whether only one cell packet is transmitted from the ABCU to the ADSL line units through all of the data buses at a time or different cell packets are transmitted simultaneously from the ABCU to the ADSL line units through different data buses.

34. The method of claim 30, wherein the card slot bits in the first routing tag byte consist of 6 bits, and wherein the card slot number is in the range of 0 to 63.

35. The method of claim 30, wherein the second routing tag byte comprises a plurality of cell type bits to indicate to the selected ADSL line unit at least one of a plurality of destination ports to which the cell packet is to be transmitted.

36. The method of claim 35, wherein the second routing tag byte further comprises a plurality of reserved bits temporally preceding the cell type bits.

37. The method of claim 35, wherein the cell type bits in the second routing tag byte are capable of indicating a selected one of the destination ports as a unicast destination for the cell packet.

38. The method of claim 37, further comprising the step of transmitting the cell packet to the unicast destination via a selected one of a plurality of downstream queues based upon the cell type bits.

39. The method of claim 37, wherein the cell type bits are further capable of indicating a selected one of a plurality of multicast groups for the cell packet, each of the multicast groups consisting of more than one of the destination ports.

40. The method of claim 39, further comprising the step of transmitting the cell packet to the destination ports in the selected multicast group via a plurality of respective downstream queues based upon the cell type bits.

41. The method of claim 39, wherein the cell type bits consist of 5 bits capable of designating a selected one of at least eight unicast destinations or a selected one of at least eight multicast groups.

42. The method of claim 35, wherein the cell type bits are further capable of carrying an idle cell indicator to signify to the selected ADSL line unit that the cell packet is to be discarded.

43. The method of claim 35, wherein the cell type bits are further capable of carrying a central processing unit (CPU) cell indicator to signify to the selected ADSL line unit that the cell packet is to be transmitted via a cell bus data link (CBDL) downstream queue.

44. The method of claim 35, wherein the cell type bits are further capable of carrying a loop back cell indicator to signify to the selected ADSL line unit that the cell packet is to be transmitted in a loop back queue from the selected ADSL line unit to the ABCU.

45. The method of claim 26, wherein each of the cell packets comprises a plurality of data bits transmitted downstream from an ADSL bank control unit (ABCU) to a plurality of ADSL line units through a data bus comprising a plurality of data lines and a clock line carrying a clock signal having rising and falling edges, wherein the clock signal has a 50% duty cycle, and wherein the data bits are transmitted on both the rising and falling edges of the clock signal.

46. The method of claim 45, wherein the data bits are transmitted with a phase shift of 90° with respect to the clock signal.

47. A method of data transmission downstream from an asymmetrical digital subscriber line (ADSL) bank control unit (ABCU) to a plurality of ADSL line units through at least one data bus comprising a plurality of data lines and a clock line carrying a clock signal having rising and falling edges, the method comprising the steps of:

(a) synchronizing frame boundaries of an asymmetrical digital subscriber line (ADSL) frame by using a subscriber bus interface (SBI) frame consisting of a predetermined number of SBI time slots;

(b) assigning a plurality of cell packets to the ADSL frame, the number of cell packets in the ADSL frame different from the number of SBI time slots in the SBI frame, each of the cell packets comprising a plurality of data bits;

(c) providing an internal cell consisting of a plurality of routing tag bytes, a plurality of reserved bytes temporally subsequent to the routing tag bytes, a plurality of header bytes temporally subsequent to the reserved bytes, and a plurality of payload bytes temporally subsequent to the header bytes;

(d) encoding the internal cell to generate an encoded internal cell;

(e) assigning the encoded internal cell to one of the cell packets in the ADSL frame; and (f) transmitting the data bits in the cell packet on both the rising and falling edges of the clock signal.

48. The method of claim 47, wherein the clock signal has a 50% duty cycle, and wherein the data bits are transmitted with a phase shift of 90° with respect to the clock signal.

49. The method of claim 47, wherein the SBI frame has a duration of 125 µs and consists of 32 SBI time slots, and wherein the ADSL frame comprises 34 cell packets each consisting of 60 bytes.

50. The method of claim 49, further comprising the step of padding 8 unused bytes after the cell packets in the ADSL frame.

51. The method of claim 47, wherein the encoded internal cell consists of 59.5 bytes.

52. The method of claim 51, further comprising the step of padding 4 unused bits after the encoded internal cell in the cell packet.

53. The method of claim 47, wherein the step of encoding the internal cell comprises the step of applying convolutional forward error correction encoding to the internal cell.

54. The method of claim 47, wherein the routing tag bytes consist of a first routing tag byte and a second routing tag byte temporally subsequent to the first routing tag byte, and wherein the first routing tag byte comprises a plurality of card slot bits to designate a card slot number for a selected one of the ADSL line units to which the cell packet is to be transmitted.

55. The method of claim 54, wherein the first routing tag byte further comprises a reserved bit.

56. The method of claim 54, wherein the first routing tag byte further comprises a version indicator bit.

57. The method of claim 56, wherein the ABCU is connected to the ADSL line units through a plurality of data buses each comprising a plurality of data lines and a clock line, and wherein the version indicator bit is capable of indicating whether only one cell packet is transmitted from the ABCU to the ADSL line units through all of the data buses at a time or different cell packets are transmitted simultaneously from the ABCU to the ADSL line units through different data buses.

58. The method of claim 54, wherein the card slot bits consist of 6 bits, and wherein the card slot number is in the range of 0 to 63.

59. The method of claim 54, wherein the second routing tag byte comprises a plurality of cell type bits to indicate to the selected ADSL line unit at least one of a plurality of destination ports to which the cell packet is to be transmitted.

60. The method of claim 59, wherein the second routing tag byte further comprises a plurality of reserved bits.

61. The method of claim 59, wherein the cell type bits are capable of indicating a selected one of the destination ports as a unicast destination for the cell packet.

62. The method of claim 61, further comprising the step of transmitting the cell packet to the unicast destination via a selected one of a plurality of downstream queues based upon the cell type bits.

63. The method of claim 61, wherein the cell type bits are further capable of indicating a selected one of a plurality of multicast groups for the cell packet, each of the multicast groups consisting of more than one of the destination ports.

64. The method of claim 63, further comprising the step of transmitting the cell packet to the destination ports in the selected multicast group via a plurality of respective downstream queues based upon the cell type bits.

65. The method of claim 63, wherein the cell type bits consist of 5 bits capable of designating a selected one of at least eight unicast destinations or a selected one of at least eight multicast groups.

66. The method of claim 59, wherein the cell type bits are further capable of carrying an idle cell indicator to signify to the selected ADSL line unit that the cell packet is to be discarded.

67. The method of claim 59, wherein the cell type bits are further capable of carrying a central processing unit (CPU) cell indicator to signify to the selected ADSL line unit that the cell packet is to be transmitted via a cell bus data link (CBDL) downstream queue.

68. The method of claim 59, wherein the cell type bits are further capable of carrying a loop back cell indicator to signify to the selected ADSL line unit that the cell packet is to be transmitted in a loop back queue from the selected ADSL line unit to the ABCU.

69. A method of routing data downstream from an asymmetrical digital subscriber line (ADSL) bank control unit (ABCU) to a plurality of ADSL line units through a plurality of data buses each comprising a plurality of data lines and a clock line in parallel, each of the ADSL line units capable of transmitting the data to a plurality of destination ports, the method comprising the steps of:

(a) providing a cell packet comprising at least two routing tag bytes, a plurality of header bytes, and a plurality of payload bytes;

(b) assigning card slot bits to one of the routing tag bytes, the card slot bits indicating a card slot number for a selected one of the ADSL line units to which the cell packet is to be transmitted; and (c) assigning a cell type indicator to another one of the routing tag bytes to indicate to the selected ADSL line unit a selected one of a plurality of unicast destination ports to which the cell packet is to be transmitted, or to indicate to the selected ADSL line unit a selected one of a plurality of multicast groups to which the cell packet is to be transmitted, wherein each one of the multicast groups consists of a plurality of destination ports selected from the unicast destination ports.

70. The method of claim 69, wherein the routing tag bytes consist of a first routing tag byte and a second routing tag byte, wherein the card slot bits are assigned to the first routing tag byte, and wherein the cell type indicator is assigned to the second routing tag byte.

71. The method of claim 70, wherein the first routing tag byte further comprises a reserved bit temporally preceding the card slot bits.

72. The method of claim 70, wherein the second routing tag byte further comprises a plurality of reserved bits temporally preceding the cell type indicator.

73. The method of claim 69, further comprising the step of assigning a version indicator bit to one of the first routing tag bytes.

74. The method of claim 73, wherein the version indicator bit is capable of indicating whether only one cell packet is transmitted from the ABCU to the ADSL line units through all of the data buses at a time or different cell packets are transmitted simultaneously from the ABCU to the ADSL line units through different data buses.

75. The method of claim 69, wherein the card slot bits consist of 6 bits, and wherein the card slot number is in the range of 0 to 63.

76. The method of claim 69, further comprising the step of transmitting the cell packet to the selected unicast destination port via a selected one of a plurality of downstream queues upon signifying by the cell type indicator to the selected ADSL line unit that the cell packet is of a unicast cell type.

77. The method of claim 69, further comprising the step of transmitting the cell packet to the destination ports in the selected multicast group via a plurality of respective downstream queues upon signifying by the cell type indicator to the selected ADSL line unit that the cell packet is of a multicast cell type.

78. The method of claim 69, wherein the cell type indicator consists of 5 bits capable of designating a selected one of at least eight unicast destination ports or a selected one of at least eight multicast groups.

79. The method of claim 69, wherein the cell type indicator is further capable of signifying that the cell packet comprises an idle cell.

80. The method of claim 71, further comprising the step of discarding the cell packet upon signifying by the cell type indicator to the selected ADSL line unit that the cell packet comprises an idle cell.

81. The method of claim 69, wherein the cell type indicator is further capable of signifying that the cell packet comprises a central processing unit (CPU) cell.

82. The method of claim 81, further comprising the step of transmitting the cell packet via a cell bus data link (CBDL) downstream queue upon signifying by the cell type indicator to the selected ADSL line unit that the cell packet comprises a CPU cell.

83. The method of claim 69, wherein the cell type indicator is further capable of signifying that the cell packet comprises a loop back cell.

84. The method of claim 83, wherein the loop back cell comprises a high speed cell bus (HSCB) loop back cell.

85. The method of claim 83, further comprising the step of transmitting the cell packet from the selected ADSL line unit to the ABCU in a loop back queue upon signifying by the cell type indicator to the selected ADSL line unit that the cell packet comprises a loop back cell.

86. The method of claim 69, wherein the clock line is capable of carrying a clock signal having rising and falling edges with a 50% duty cycle.

87. The method of claim 86, wherein the cell packet comprises a plurality of data bits transmitted on both the rising and falling edges of the clock signal.

88. The method of claim 87, wherein the data bits are transmitted with a phase shift of 90° with respect to the clock signal.

89. The method of claim 69, further comprising the step of encoding the cell packet by applying convolutional forward error correction encoding to the cell packet.

90. A method of routing data downstream by an asymmetrical digital subscriber line (ADSL) line card capable of transmitting the data to at least one of a plurality of destination ports, the method comprising the steps of:

(a) receiving a cell packet comprising first and second routing tag bytes and a plurality of payload bytes carrying the data, the first routing tag byte comprising a plurality of card slot bits designating a card slot number for any one of a plurality of ADSL line units selected to receive the cell packet, the second routing tag byte comprising a cell type indicator to signify to the selected ADSL line unit that the cell packet is of a unicast cell type by designating a selected one of a plurality of unicast destination ports to which the cell packet is to be transmitted from the selected ADSL line unit, or to signify to the selected ADSL line unit that the cell packet is of a multicast cell type by designating a selected one of a plurality of multicast groups to which the cell packet is to be transmitted from the selected ADSL line unit, wherein each of the multicast groups consists of a plurality of destination ports selected from the unicast destination ports;

(b) determining whether the card slot number carried by the card slot bits in the first routing tag byte identifies the ADSL line unit as the one selected to receive the cell packet; and (c) transmitting the cell packet from the selected ADSL line unit to the selected unicast destination port or to the destination ports in the selected multicast group depending upon the cell type indicator.

91. The method of claim 90, wherein the first routing tag byte further comprises at least one reserved bit temporally preceding the card slot bits.

92. The method of claim 90, wherein the second routing tag byte further comprises at least one reserved bit temporally preceding the cell type indicator.

93. The method of claim 90, wherein the card slot bits consist of 6 bits, and wherein the card slot number is in the range of 0 to 63.

94. The method of claim 90, wherein the cell type indicator consists of 5 bits capable of designating a selected one of at least eight unicast destination ports or a selected one of at least eight multicast groups.

95. The method of claim 90, wherein the cell type indicator is further capable of signifying that the cell packet comprises an idle cell.

96. The method of claim 90, further comprising the step of discarding the cell packet upon signifying by the cell type indicator to the selected ADSL line unit that the cell packet comprises an idle cell.

97. The method of claim 90, wherein the cell type indicator is further capable of signifying that the cell packet comprises a central processing unit (CPU) cell.

98. The method of claim 97, further comprising the step of transmitting the cell packet via a cell bus data link (CBDL) downstream queue upon signifying by the cell type indicator to the selected ADSL line unit that the cell packet comprises a CPU cell.

99. The method of claim 90, wherein the cell type indicator is further capable of signifying that the cell packet comprises a loop back cell.

100. The method of claim 99, wherein the loop back cell comprises a high speed cell bus (HSCB) loop back cell.

101. The method of claim 99, further comprising the step of transmitting the cell packet from the selected ADSL line unit to the ABCU in a loop back queue upon signifying by the cell type indicator to the selected ADSL line unit that the cell packet comprises a loop back cell.

102. A communications system, comprising:

(a) an asymmetrical digital subscriber line (ADSL) bank control unit (ABCU) comprising a plurality of cell buses;

(b) a plurality of sets of data lines and a plurality of clock lines connected to the cell buses; and (c) a plurality of ADSL line units arranged in a plurality of rows, the ADSL line units in each row connected to a respective one of the cell buses through a respective one of the sets of data lines and a respective one of the clock lines, wherein data bits are transmitted within a plurality of internal cells in a plurality of cell packets in an ADSL frame through the data lines from the ABCU to the ADSL line units, wherein a clock signal is provided through each of the clock lines, wherein frame boundaries of the ADSL frame are synchronized by using a subscriber bus interface (SBI) frame consisting of a predetermined number of SBI time slots, the number of cell packets in the ADSL frame different from the number of SBI time slots in the SBI frame, and wherein each of the internal cells comprises a plurality of routing tag bytes, a plurality of header bytes, and a plurality of payload bytes.

103. The system of claim 102, wherein the SBI frame has a duration of 125 μs and consists of 32 SBI time slots, and wherein the ADSL frame comprises 34 cell packets each consisting of 60 bytes.

104. The system of claim 103, wherein the ADSL frame further comprises 8 unused bytes temporally subsequent to the cell packets.

105. The system of claim 102, wherein each of the internal cells is encoded to generate an encoded internal cell for transmission within a respective one of the cell packets.

106. The system of claim 105, wherein each of the internal cells consists of two routing tag bytes, two reserved bytes temporally subsequent to the routing tag bytes, four header bytes temporally subsequent to the reserved bytes, and 48 payload bytes temporally subsequent to the header bytes.

107. The system of claim 106, wherein the encoded internal cell in each of the cell packets consists of 59.5 bytes.

108. The system of claim 107, wherein each of the cell packets further comprises 4 unused bits temporally subsequent to the encoded internal cell.

109. The system of claim 105, wherein convolutional forward error correction encoding is applied to the internal cell to generate the encoded internal cell.

110. The system of claim 102, wherein the routing tag bytes consist of a first routing tag byte and a second routing tag byte, and wherein the first routing tag byte comprises a plurality of card slot bits to designate a card slot number for a selected one of the ADSL line units to which the cell packet is to be transmitted.

111. The system of claim 110, wherein the first routing tag byte further comprises a reserved bit.

112. The system of claim 110, wherein the first routing tag byte further comprises a version indicator bit.

113. The system of claim 112, wherein the version indicator bit is capable of indicating whether only one cell packet is transmitted from the ABCU to the ADSL line units through all of the cell buses at a time or different cell packets are transmitted simultaneously from the ABCU to different rows of the ADSL line units through different cell buses.

114. The system of claim 110, wherein the card slot bits consist of 6 bits, and wherein the card slot number is in the range of 0 to 63.

115. The system of claim 110, wherein each of the ADSL line units comprises a plurality of destination ports, and wherein the second routing tag byte comprises a plurality of cell type bits to indicate to the selected ADSL line unit at least one of the destination ports to which the cell packet is to be transmitted.

116. The system of claim 115, wherein the second routing tag byte further comprises a plurality of reserved bits temporally preceding the cell type bits.

117. The system of claim 115, wherein the cell type bits are capable of indicating a selected one of the destination ports as a unicast destination port for the cell packet.

118. The system of claim 117, wherein each of the ADSL line units further comprises a router to direct the cell packet to the unicast destination port based upon the cell type bits.

119. The system of claim 118, wherein the cell type bits are further capable of indicating a selected one of a plurality of multicast groups for the cell packet, each of the multicast groups consisting of more than one of the destination ports, and wherein the router is capable of directing the cell packet to the destination ports in the selected multicast group based upon the cell type bits.

120. The system of claim 115, further comprises a plurality of modems connected to the destination ports, respectively.

121. The system of claim 115, wherein the cell type bits consist of 5 bits capable of designating a selected one of at least eight unicast destination ports or a selected one of at least eight multicast groups.

122. The system of claim 115, wherein the cell type bits are further capable of carrying an idle cell indicator to signify to the selected ADSL line unit that the cell packet is to be discarded.

123. The system of claim 115, wherein the cell type bits are further capable of carrying a central processing unit (CPU) cell indicator to signify to the selected ADSL line unit that the cell packet is to be transmitted via a cell bus data link (CBDL) downstream queue.

124. The system of claim 115, wherein the cell type bits are further capable of carrying a loop back cell indicator to signify to the selected ADSL line unit that the cell packet is to be transmitted in a loop back queue from the selected ADSL line unit to the ABCU.

125. The system of claim 102, wherein the clock signal has a 50% duty cycle with rising and falling edges, and wherein the data bits are transmitted on both the rising and falling edges of the clock signal.

126. The system of claim 125, wherein the data bits are transmitted with a phase shift of 90° with respect to the clock signal.

127. The system of claim 102, wherein each of the cell buses comprises a high speed cell bus (HSCB).

128. The system of claim 102, further comprising an additional ABCU comprising a plurality of cell buses each connected to a respective one of the rows of ADSL line units.

129. A communications system, comprising:
(a) an asymmetrical digital subscriber line (ADSL) bank control unit (ABCU) comprising a plurality of cell buses;
(b) a plurality of sets of data lines and a plurality of clock lines connected to the cell buses; and
(c) a plurality of ADSL line units arranged in a plurality of rows, each of the ADSL line units comprising a plurality of destination ports, the ADSL line units in each row connected to a respective one of the cell buses through a respective one of the sets of data lines and a respective one of the clock lines,
wherein data bits are transmitted within a plurality of internal cells in a plurality of cell packets in an ADSL frame through the data lines from the ABCU to the ADSL line units,
wherein a clock signal is transmitted through each of the clock lines to provide a timing reference for the data bits,
wherein frame boundaries of the ADSL frame are synchronized by using a subscriber bus interface (SBI) frame consisting of a predetermined number of SBI time slots, the number of cell packets in the ADSL frame different from the number of SBI time slots in the SBI frame,
wherein each of the internal cells comprises a first routing tag byte, a second routing tag byte, a plurality of header bytes temporally subsequent to the routing tag bytes, and a plurality of payload bytes temporally subsequent to the header bytes,
wherein the first routing tag byte comprises a plurality of card slot bits to designate a card slot number for a selected one of the ADSL line units to which the cell packet is to be transmitted, and
wherein the second routing tag byte comprises a plurality of cell type bits to indicate to the selected ADSL line unit at least one of the destination ports to which the cell packet is to be transmitted.

130. The system of claim 129, wherein the SBI frame has a duration of 125 µs and consists of 32 SBI time slots, and wherein the ADSL frame comprises 34 cell packets each consisting of 60 bytes.

131. The system of claim 130, wherein the ADSL frame further comprises 8 unused bytes temporally subsequent to the cell packets.

132. The system of claim 129, wherein each of the internal cells is encoded to generate an encoded internal cell for transmission within a respective one of the cell packets.

133. The system of claim 132, wherein the encoded internal cell consists of 59.5 bytes.

134. The system of claim 133, wherein each of the cell packets further comprises 4 unused bits temporally subsequent to the encoded internal cell.

135. The system of claim 132, wherein convolutional forward error correction encoding is applied to the internal cell to generate the encoded internal cell.

136. The system of claim 129, wherein the first routing tag byte further comprises a reserved bit temporally preceding the card slot bits.

137. The system of claim 129, wherein the first routing tag byte further comprises a version indicator bit.

138. The system of claim 137, wherein the version indicator bit is capable of indicating whether only one cell packet is transmitted from the ABCU to the ADSL line units through all of the cell buses at a time or different cell packets are transmitted simultaneously from the ABCU to different rows of the ADSL line units through different cell buses.

139. The system of claim 129, wherein the card slot bits consist of 6 bits, and wherein the card slot number is in the range of 0 to 63.

140. The system of claim 129, wherein the second routing tag byte further comprises a plurality of reserved bits temporally preceding the cell type bits.

141. The system of claim 129, wherein each of the ADSL line units further comprises a router to direct the cell packet to a selected one of the destination ports based upon the cell type bits.

142. The system of claim 141, wherein the cell type bits are further capable of indicating a selected one of a plurality of multicast groups for the cell packet, each of the multicast groups consisting of more than one of the destination ports, and wherein the router is capable of directing the cell packet to the destination ports in the selected multicast group based upon the cell type bits.

143. The system of claim 129, further comprises a plurality of modems connected to the destination ports, respectively.

144. The system of claim 129, wherein the cell type bits consist of 5 bits capable of designating a selected one of at least eight unicast destination ports or a selected one of at least eight multicast groups.

145. The system of claim 129, wherein the cell type bits are further capable of carrying an idle cell indicator to signify to the selected ADSL line unit that the cell packet is to be discarded.

146. The system of claim 129, wherein the cell type bits are further capable of carrying a central processing unit (CPU) cell indicator to signify to the selected ADSL line unit that the cell packet is to be transmitted via a cell bus data link (CBDL) downstream queue.

147. The system of claim 129, wherein the cell type bits are further capable of carrying a loop back cell indicator to signify to the selected ADSL line unit that the cell packet is to be transmitted in a loop back queue from the selected ADSL line unit to the ABCU.

148. The system of claim 129, wherein the clock signal has a 50% duty cycle with rising and falling edges, and wherein the data bits are transmitted on both the rising and falling edges of the clock signal.

149. The system of claim 148, wherein the data bits are transmitted with a phase shift of 90° with respect to the clock signal.

150. The system of claim 129, wherein each of the cell buses comprises a high speed cell bus (HSCB).

151. The system of claim 129, further comprising an additional ABCU comprising a plurality of cell buses each connected to a respective one of the rows of ADSL line units.

152. A communications system, comprising:
(a) an asymmetrical digital subscriber line (ADSL) bank control unit (ABCU) comprising a plurality of cell buses;
(b) a plurality of sets of data lines and a plurality of clock lines connected to the cell buses; and
(c) a plurality of ADSL line units arranged in a plurality of rows, the ADSL line units in each row connected to a respective one of the cell buses through a respective one of the sets of data lines and a respective one of the clock lines,
wherein convolutional forward error correction encoded data bits are transmitted within a plurality of cell packets in an ADSL frame through the data lines from the ABCU to the ADSL line units,
wherein a clock signal is transmitted through each of the clock lines to provide a timing reference for the data bits,
wherein frame boundaries of the ADSL frame are synchronized by using a subscriber bus interface (SBI) frame consisting of a predetermined number of subscriber bus interface (SBI) time slots, the number of cell packets in the ADSL frame different from the number of SBI time slots in the SBI frame,
wherein each of the cell packets carries an internal cell comprising a plurality of routing tag bytes, a plurality of header bytes temporally subsequent to the routing tag bytes, and a plurality of payload bytes temporally subsequent to the header bytes,
wherein the clock signal has rising and falling edges, and
wherein the data bits are transmitted on both the rising and falling edges of the clock signal with a phase shift with respect to the clock signal.

153. The system of claim 152, wherein the ADSL frame comprises 34 cell packets each consisting of 60 bytes.

154. The system of claim 153, wherein the ADSL frame further comprises 8 unused bytes temporally subsequent to the cell packets.

155. The system of claim 152, wherein the routing tag bytes consist of a first routing tag byte and a second routing tag byte temporally subsequent to the first routing tag byte, and wherein the first routing tag byte comprises a plurality of card slot bits to designate a card slot number for a selected one of the ADSL line units to which the cell packet is to be transmitted.

156. The system of claim 155, wherein the first routing tag byte further comprises a reserved bit temporally preceding the card slot bits.

157. The system of claim 155, wherein the first routing tag byte further comprises a version indicator bit.

158. The system of claim 157, wherein the version indicator bit is capable of indicating whether only one cell packet is transmitted from the ABCU to the ADSL line units through all of the cell buses at a time or different cell packets are transmitted simultaneously from the ABCU to different rows of the ADSL line units through different cell buses.

159. The system of claim 155, wherein the card slot bits consist of 6 bits, and wherein the card slot number is in the range of 0 to 63.

160. The system of claim 155, wherein each of the ADSL line units comprises a plurality of destination ports, and wherein the second routing tag byte comprises a plurality of cell type bits to indicate to the selected ADSL line unit at least one of the destination ports to which the cell packet is to be transmitted.

161. The system of claim 160, wherein the second routing tag byte further comprises a plurality of reserved bits temporally preceding the cell type bits.

162. The system of claim 160, wherein the cell type bits are capable of indicating a selected one of the destination ports as a unicast destination port for the cell packet.

163. The system of claim 162, wherein each of the ADSL line units further comprises a router to direct the cell packet to the unicast destination port based upon the cell type bits.

164. The system of claim 163, wherein the cell type bits are further capable of indicating a selected one of a plurality of multicast groups for the cell packet, each of the multicast groups consisting of more than one of the destination ports, and wherein the router is capable of directing the cell packet to the destination ports in the selected multicast group based upon the cell type bits.

165. The system of claim 164, wherein the cell type bits consist of 5 bits capable of designating a selected one of at least eight unicast destination ports or a selected one of at least eight multicast groups.

166. The system of claim 160, further comprises a plurality of modems connected to the destination ports, respectively.

167. The system of claim 160, wherein the cell type bits are further capable of carrying an idle cell indicator to signify to the selected ADSL line unit that the cell packet is to be discarded.

168. The system of claim 160, wherein the cell type bits are further capable of carrying a central processing unit (CPU) cell indicator to signify to the selected ADSL line unit that the cell packet is to be transmitted via a cell bus data link (CBDL) downstream queue.

169. The system of claim 160, wherein the cell type bits are further capable of carrying a loop back cell indicator to signify to the selected ADSL line unit that the cell packet is to be transmitted in a loop back queue from the selected ADSL line unit to the ABCU.

170. The system of claim 152, wherein the data bits are phase shifted 90° with respect to the clock signal.

171. The system of claim 152, wherein each of the cell buses comprises a high speed cell bus (HSCB).

172. The system of claim 152, further comprising an additional ABCU comprising a plurality of cell buses each connected to a respective one of the rows of ADSL line units.

173. A communications system, comprising:
(a) an asymmetrical digital subscriber line (ADSL) bank control unit (ABCU) comprising a plurality of cell buses;
(b) a plurality of sets of data lines and a plurality of clock lines connected to the cell buses; and
(c) a plurality of ADSL line units arranged in a plurality of rows, the ADSL line units in each row connected to a respective one of the cell buses through a respective one of the sets of data lines and a respective one of the clock lines,
wherein data bits are transmitted within a plurality of cell packets in an ADSL frame through the data lines from the ABCU to the ADSL line units,
wherein a clock signal is transmitted through each of the clock lines to provide a timing reference for the data bits,
wherein frame boundaries of the ADSL frame are synchronized by using a subscriber bus interface (SBI) frame consisting of a predetermined number of SBI time slots, the number of cell packets in the ADSL frame different from the number of SBI time slots in the SBI frame,
wherein each of the cell packets carries an internal cell comprising a first routing tag byte, a second routing tag byte, a plurality of header bytes, and a plurality of payload bytes, and
wherein the first routing tag byte comprises a version indicator bit capable of indicating whether only one cell packet is transmitted from the ABCU to the ADSL line units through all of the cell buses at a time or different cell packets are transmitted simultaneously from the ABCU to different rows of the ADSL line units through different cell buses.

174. The system of claim 173, wherein the SBI frame consists of 32 SBI time slots, and wherein the ADSL frame comprises 34 cell packets each consisting of 60 bytes.

175. The system of claim 174, wherein the ADSL frame further comprises 8 unused bytes temporally subsequent to the cell packets.

176. The system of claim 173, wherein the internal cell is encoded to generate an encoded internal cell for transmission within the cell packet.

177. The system of claim 176, wherein convolutional forward error correction encoding is applied to the internal cell to generate the encoded internal cell.

178. The system of claim 173, wherein the first routing tag byte further comprises a plurality of card slot bits to designate a card slot number for a selected one of the ADSL line units to which the cell packet is to be transmitted.

179. The system of claim 178, wherein the first routing tag byte further comprises a reserved bit temporally preceding the card slot bits.

180. The system of claim 178, wherein the card slot bits consist of 6 bits, and wherein the card slot number is in the range of 0 to 63.

181. The system of claim 178, wherein each of the ADSL line units comprises a plurality of destination ports, and wherein the second routing tag byte comprises a plurality of cell type bits to indicate to the selected ADSL line unit at least one of the destination ports to which the cell packet is to be transmitted.

182. The system of claim 181, wherein the second routing tag byte further comprises a plurality of reserved bits temporally preceding the cell type bits.

183. The system of claim 181, wherein the cell type bits are capable of indicating a selected one of the destination ports as a unicast destination port for the cell packet.

184. The system of claim 183, wherein each of the ADSL line units further comprises a router to direct the cell packet to the unicast destination port based upon the cell type bits.

185. The system of claim 184, wherein the cell type bits are further capable of indicating a selected one of a plurality of multicast groups for the cell packet, each of the multicast groups consisting of more than one of the destination ports, and wherein the router is capable of directing the cell packet to the destination ports in the selected multicast group based upon the cell type bits.

186. The system of claim 181, wherein the cell type bits consist of 5 bits capable of designating a selected one of at least eight unicast destination ports or a selected one of at least eight multicast groups.

187. The system of claim 181, further comprises a plurality of modems connected to the destination ports, respectively.

188. The system of claim 181, wherein the cell type bits are further capable of carrying an idle cell indicator to signify to the selected ADSL line unit that the cell packet is to be discarded.

189. The system of claim 181, wherein the cell type bits are further capable of carrying a central processing unit (CPU) cell indicator to signify to the selected ADSL line unit that the cell packet is to be transmitted via a cell bus data link (CBDL) downstream queue.

190. The system of claim 181, wherein the cell type bits are further capable of carrying a loop back cell indicator to signify to the selected ADSL line unit that the cell packet is to be transmitted in a loop back queue from the selected ADSL line unit to the ABCU.

191. The system of claim 173, wherein the clock signal has a 50% duty cycle with rising and falling edges, and wherein the data bits are transmitted on both the rising and falling edges of the clock signal.

192. The system of claim 191, wherein the data bits are transmitted with a phase shift of 90° with respect to the clock signal.

193. The system of claim 173, wherein each of the cell buses comprises a high speed cell bus (HSCB).

194. The system of claim 173, further comprising an additional ABCU comprising a plurality of cell buses each connected to a respective one of the rows of ADSL line units.

195. A communications system, comprising:
- (a) an asymmetrical digital subscriber line (ADSL) bank control unit (ABCU) comprising a plurality of cell buses;
- (b) a plurality of sets of data lines and a plurality of clock lines connected to the cell buses; and
- (c) a plurality of ADSL line units arranged in a plurality of rows, the ADSL line units in each row connected to a respective one of the cell buses through a respective one of the sets of data lines and a respective one of the clock lines, each of the ADSL line units comprising:
  - (i) a plurality of destination ports; and
  - (ii) a router connected to the destination ports,
  wherein data bits are transmitted within a plurality of cell packets in an ADSL frame through the data lines from the ABCU to the ADSL line units,
  wherein a clock signal is transmitted through each of the clock lines to provide a timing reference for the data bits,
  wherein frame boundaries of the ADSL frame are synchronized by using a subscriber bus interface (SBI) frame consisting of a predetermined number of SBI time slots, the number of cell packets in the ADSL frame different from the number of SBI time slots in the SBI frame,
  wherein each of the cell packets carries an internal cell comprising a first routing tag byte, a second routing tag byte, a plurality of header bytes temporally subsequent to the routing tag bytes, and a plurality of payload bytes temporally subsequent to the header bytes,
  wherein the first routing tag byte comprises a plurality of card slot bits to designate a card slot number for a selected one of the ADSL line units to receive the cell packet from the ABCU, and
  wherein the second routing tag byte comprises a plurality of cell type bits to direct the router in the selected ADSL line unit to transmit the cell packet to a selected one of the destination ports as a unicast destination, or to more than one of the destination ports in a multicast group.

196. The system of claim 195, wherein the first routing tag byte further comprises a reserved bit temporally preceding the card slot bits.

197. The system of claim 195, wherein the first routing tag byte further comprises a version indicator bit.

198. The system of claim 197, wherein the version indicator bit is capable of indicating whether only one cell packet is transmitted from the ABCU to the ADSL line units through all of the cell buses at a time or different cell packets are transmitted simultaneously from the ABCU to different rows of the ADSL line units through different cell buses.

199. The system of claim 195, wherein the card slot bits consist of 6 bits, and wherein the card slot number is in the range of 0 to 63.

200. The system of claim 195, wherein the second routing tag byte further comprises a plurality of reserved bits temporally preceding the cell type bits.

201. The system of claim 195, further comprises a plurality of modems connected to the destination ports, respectively.

202. The system of claim 195, wherein the cell type bits consist of 5 bits capable of designating a selected one of at least eight unicast destinations or a selected one of at least eight multicast groups.

203. The system of claim 195, wherein the cell type bits are further capable of carrying an idle cell indicator to signify to the selected ADSL line unit that the cell packet is to be discarded.

204. The system of claim 195, wherein the cell type bits are further capable of carrying a central processing unit (CPU) cell indicator to signify to the selected ADSL line unit that the cell packet is to be transmitted via a cell bus data link (CBDL) downstream queue.

205. The system of claim 195, wherein the cell type bits are further capable of carrying a loop back cell indicator to signify to the selected ADSL line unit that the cell packet is to be transmitted in a loop back queue from the selected ADSL line unit to the ABCU.

206. The system of claim 195, wherein the clock signal has a 50% duty cycle with rising and falling edges, and wherein the data bits are transmitted on both the rising and falling edges of the clock signal.

207. The system of claim 206, wherein the data bits are transmitted with a phase shift of 90° with respect to the clock signal.

208. The system of claim 195, wherein each of the cell buses comprises a high speed cell bus (HSCB).

209. The system of claim 195, further comprising an additional ABCU comprising a plurality of cell buses each connected to a respective one of the rows of ADSL line units.

\* \* \* \* \*